(12) United States Patent
Brochard et al.

(10) Patent No.: US 9,328,630 B2
(45) Date of Patent: May 3, 2016

(54) LATERAL PROPULSION UNIT FOR AIRCRAFT COMPRISING A TURBINE ENGINE SUPPORT ARCH

(71) Applicant: Airbus Operations (SAS), Toulouse (FR)

(72) Inventors: Wolfgang Brochard, Toulouse (FR); Romain Terral, Toulouse (FR)

(73) Assignee: Airbus Operations (SAS), Toulouse (FR)

( * ) Notice: Subject to any disclaimer, the term of this patent is extended or adjusted under 35 U.S.C. 154(b) by 430 days.

(21) Appl. No.: 14/016,296

(22) Filed: Sep. 3, 2013

(65) Prior Publication Data

US 2014/0064950 A1 Mar. 6, 2014

(30) Foreign Application Priority Data

Sep. 6, 2012 (FR) ...................................... 12 58335

(51) Int. Cl.
| | |
|---|---|
| *B64D 27/00* | (2006.01) |
| *F01D 25/24* | (2006.01) |
| *B64D 27/20* | (2006.01) |
| *B64D 27/26* | (2006.01) |
| *B64D 29/06* | (2006.01) |

(52) U.S. Cl.
CPC ............... *F01D 25/24* (2013.01); *B64D 27/20* (2013.01); *B64D 27/26* (2013.01); *B64D 29/06* (2013.01); *Y02T 50/44* (2013.01)

(58) Field of Classification Search
USPC .................... 244/54; 248/555, 556, 554, 557; 60/797, 796
See application file for complete search history.

(56) References Cited

U.S. PATENT DOCUMENTS

| | | | |
|---|---|---|---|
| 4,044,973 A | 8/1977 | Moorehead | |
| 4,821,980 A * | 4/1989 | Clausen | ................. B64D 27/26 244/54 |
| 5,065,959 A * | 11/1991 | Bhatia | ..................... B64D 27/14 244/54 |
| 5,443,229 A * | 8/1995 | O'Brien | ................. B64D 27/20 244/54 |
| 6,869,046 B2 * | 3/2005 | McEvoy | ................ B64D 29/08 239/265.19 |
| 7,007,890 B2 * | 3/2006 | Beutin | ................... B64D 27/20 244/54 |
| 7,740,200 B2 * | 6/2010 | Diochon | ............... B64D 27/26 244/54 |
| 7,806,364 B1 * | 10/2010 | Udall | .................... F01D 21/045 244/54 |
| 8,042,342 B2 * | 10/2011 | Diochon | ............... B64D 27/26 244/54 |
| 8,439,300 B2 * | 5/2013 | Lafont | ................... B64D 27/14 244/54 |
| 8,540,186 B2 * | 9/2013 | Marche | ................. B64D 27/14 244/54 |
| 8,733,693 B2 * | 5/2014 | Journade | ............... B64D 27/26 244/54 |
| 2005/0178887 A1 | 8/2005 | Beutin et al. | |
| 2011/0296676 A1 | 12/2011 | Bonnet et al. | |

FOREIGN PATENT DOCUMENTS

| | | |
|---|---|---|
| FR | 2862045 | 5/2005 |
| FR | 2939409 | 6/2010 |

OTHER PUBLICATIONS

French Search Report, Apr. 30, 2013.

* cited by examiner

*Primary Examiner* — Christopher P Ellis
(74) *Attorney, Agent, or Firm* — Greer, Burns & Crain Ltd.

(57) ABSTRACT

A propulsion unit for an aircraft, comprising one turbine engine and a mounting device for a turbine engine designed to be added laterally on an aircraft structure and comprising a rigid mounting structure. The rigid mounting structure supports at least one arch which is concave towards the longitudinal axis of the propulsion unit and which has a distal end at an angular distance of between 45 and 120 degrees from a vertical plane passing through the axis, on the other side of the structure, and supporting a distal connecting element connecting the turbine engine to the arch.

13 Claims, 13 Drawing Sheets

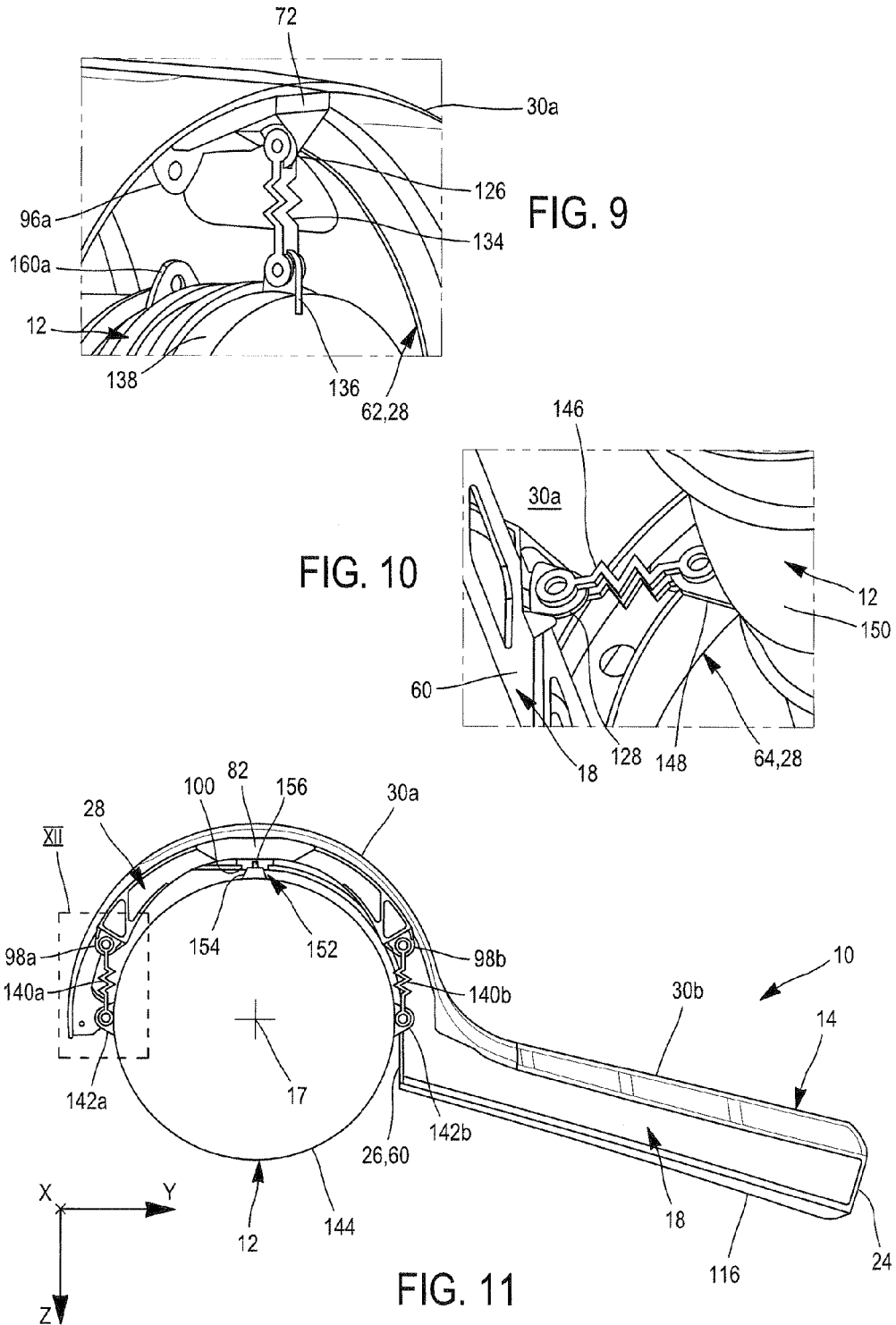

LATERAL PROPULSION UNIT FOR AIRCRAFT COMPRISING A TURBINE ENGINE SUPPORT ARCH

CROSS-REFERENCES TO RELATED APPLICATIONS

This application claims the benefit of the French patent application No. 12 58335 filed on Sep. 6, 2012, the entire disclosures of which are incorporated herein by way of reference.

BACKGROUND OF THE INVENTION

This invention relates to the domain of aircraft propulsion units and most particularly concerns means of attaching turbine engines onto the structure of aircraft.

In aircraft, and particularly in planes, conventional turbojets and open rotor turbojets, are usually supported by an engine mounting structure (EMS) comprising a rigid box shaped structure comprising means of connecting the turbojet to this rigid structure. These connecting means are usually distributed into a forward engine mounting and an aft engine mounting globally centered relative to a median plane of the rigid structure, and two thrust resistance rods located on each side of this median plane.

Engine mounting structures of this type are shown in FIG. 1 in international patent application No. WO2009/147341 A2 for mounting a conventional turbojet under the main wing of an aircraft and in FIGS. 1 and 2 in international patent application WO2010/031959 A1 for the case of an open rotor turbojet mounted on the side of the rear part of an aircraft fuselage.

However, these engine mounting structures do not give an optimum distribution of the means connecting the turbine engine to the rigid structure of these engine mounting structures. These connecting means are concentrated at the distal end of the rigid structure, in other words the end facing the turbine engine.

Thus, it is impossible for these connecting means to resist forces optimally.

Furthermore, this type of configuration limits possibilities of integrating mechanical energy dissipation elements to limit the transmission of vibrations from the turbine engine to the aircraft structure.

This type of configuration also significantly complicates integration of means for controlling turbine engine inclination, particularly upwards or downwards.

Furthermore, engine mountings are usually adjacent to bladed turbine engine rotation wheels. It is thus necessary to make these engine mountings redundant in order to allow for accidental tearing off of one or several blades from such a bladed wheel, also called an UERF (Uncontained Engine Rotor Failure), by adding engine mountings called "failsafe engine mounts" that are not loaded during normal operation, such that if a failure of one or several engine mountings occurs, the other engine mountings will be capable of resisting turbine engine support forces by themselves.

Furthermore, engine mountings located at the distal end of the rigid structure make it necessary to translate the turbine engine approximately along a direction in a median plane of the rigid structure to attach and detach this turbine engine.

If a turbine engine is mounted on the side of a plane fuselage, this median plane of the rigid structure is inclined from the vertical direction such that a complete assembly or disassembly procedure for such a turbine engine includes at least two successive translations, one translation along the vertical direction and one translation along the direction of the median plane of the rigid structure.

It is thus desirable to be able to simplify turbine engine mounting and dismounting procedures.

SUMMARY OF THE INVENTION

The purpose of the invention is particularly to provide a simple, economic and efficient solution to these problems, capable of at least partly overcoming the above-mentioned disadvantages.

To achieve this, the invention proposes a propulsion unit for an aircraft comprising a turbine engine with a longitudinal axis parallel to a longitudinal direction of the turbine engine and an engine mounting device that will be added laterally on an aircraft structure such as a fuselage, said mounting device comprising a rigid mounting structure with a proximal end that will be connected to the aircraft structure and an opposite distal end arranged facing the turbine engine, and said rigid mounting structure supporting connecting means which connect the turbine engine to the rigid mounting structure.

Said connecting means comprise at least one arch concave towards said longitudinal axis and having a proximal end connected to said rigid mounting structure and an opposite distal end.

Furthermore, the proximal and distal ends of the arch extend on each side of a longitudinal plane containing said longitudinal axis and that will extend vertically when said propulsion unit is fitted on an aircraft parked on the ground.

Furthermore, said arch is shaped such that when this arch is seen in a sectional view on a transverse plane orthogonal to said longitudinal axis, two half-lines delimit an angular sector with an angle of between 45 degrees and 120 degrees, wherein the two half lines start from said longitudinal axis, the first half line passing through the distal end of said arch, and the second half line being contained in said longitudinal plane and intercepting said arch.

"Connecting means" connecting the turbine engine to the rigid mounting structure refers to means capable of transmitting forces resulting from the turbine engine support and forces resulting from the thrust generated by the turbine engine, to the rigid mounting structure.

Furthermore, throughout this description, the "proximal" or "distal" nature of an element relates to the distance of this element from the end of the rigid mounting structure that will be connected to an aircraft structure. Thus, when the propulsion unit is fitted on an aircraft, "proximal" means that the element is at the near end to said aircraft structure and "distal" means that the element is at the far end from said aircraft structure.

The longitudinal direction of the turbine engine or the propulsion unit is defined as being the direction of the above-mentioned longitudinal axis of this turbine engine.

The arrangement of the two half-lines mentioned above reflects the angular distance of the distal end of the arch from said longitudinal plane.

In general, the invention can improve the distribution of turbine engine connecting means.

These connecting means include the above-mentioned arch and are therefore distributed over a given circumferential range about the longitudinal axis of the turbine engine.

According to the invention, said connecting means comprise a distal connecting element connecting the turbine engine to a distal mounting part of said arch arranged on the same side of said longitudinal plane as said distal end of said arch, said distal mounting part being arranged such that when said arch is seen in a sectional view along said transverse plane, said distal mounting part extends outside an angular sector with an angle between 25 degrees and 100 degrees having said longitudinal axis as vertex and extending from said second half-line towards said distal end of said arch.

The arrangement of the distal connecting element on the opposite side of the rigid mounting structure, relative to a vertical plane passing through the longitudinal axis of the turbine engine, has advantageous capabilities for resisting turbine engine forces and for damping turbine engine vibrations.

In this regard, said distal connecting element is preferably arranged at a distal end of said arch.

In one preferred embodiment of the invention, said connecting means also comprise a proximal connecting element connecting the turbine engine to a proximal mounting part of said arch, said proximal mounting part being arranged such that when said arch is seen in a sectional view on said transverse plane, said proximal mounting part extends outside an angular sector with an angle of between 25 degrees and 100 degrees, with said longitudinal axis as vertex, and extending from said second half-line towards said rigid mounting structure.

The proximal connecting element and the distal connecting element mentioned above are preferably arranged symmetrically about said longitudinal plane.

Preferably, said distal connecting element and/or said proximal connecting element is/are a mechanical energy dissipation element that will damp turbine engine vibrations.

As a variant, one and/or the other of these connecting elements may be an engine mounting.

In general, said connecting means connecting said turbine engine to said rigid mounting structure preferably comprise a plurality of engine mountings that are capable of jointly resisting all connecting forces of the turbine engine to the rigid mounting structure, and arranged so as to enable referencing of the turbine engine relative to the rigid mounting structure, by displacement of the turbine engine from the ground in translation along the vertical direction.

"Referencing" the turbine engine means positioning the turbine engine in its functioning position, such position being suitable for attachment of the above-mentioned engine mountings to the turbine engine.

Dismounting the turbine engine from its functioning position, and conversely its connection to the mounting device from the ground, can thus be achieved by simple displacement of the turbine engine in translation along the vertical direction.

To achieve this, said connection means connecting the turbine engine to the rigid mounting structure are preferably entirely integrated into a region of space delimited by two half-planes each delimited by said longitudinal axis and extending symmetrically on each side of a longitudinal plane containing said longitudinal axis and that will extend vertically when said propulsion unit is installed on an aircraft parked on the ground, each of said half-planes forming an angle of less than 120 degrees with said longitudinal plane, said region in space being designed to extend above said half-planes when said propulsion unit is installed on an aircraft parked on the ground.

In general, said rigid mounting structure is preferably in the form of a box, in other words an assembly of braced spars and ribs.

Furthermore, the above-mentioned arch advantageously prolongs a spar in said rigid mounting structure.

This spar in said rigid mounting structure preferably forms a first end of said rigid mounting structure, along the longitudinal direction of the turbine engine.

Furthermore, said connecting means advantageously have another arch concave towards said longitudinal axis of the turbine engine and with a distal end extending on the side of said longitudinal plane opposite said rigid mounting structure, said other arch being shaped such that when it is seen in section along said transverse plane, two half-lines starting from said longitudinal axis, the first of which passes through the distal end of said arch and the second of which is contained in said longitudinal plane and intercepts said other arch, together delimit an angular sector with an angle of between 45 degrees and 120 degrees.

This other arch may have one or several of the optional characteristics described above related to the above-mentioned first arch.

In particular, this other arch preferably prolongs another spar of said rigid mounting structure.

Furthermore, said other spar advantageously forms a second end opposite said first end of said rigid mounting structure.

In general, the presence of said other arch can further improve the distribution of said connecting means.

Furthermore, said connecting means advantageously comprise a longitudinal beam supported by each arch connected to said rigid mounting structure.

Such a longitudinal beam can stiffen said arches and further improve the distribution of connecting means.

The connection between this longitudinal beam and each arch may for example be made by embedding this beam into a notch or an orifice formed in a transverse web of the arch.

The longitudinal beam is preferably centered relative to said longitudinal plane.

Furthermore, this longitudinal beam also preferably comprises at least one engine mounting.

This engine mounting is preferably flexible, in other words it is elastic along its working direction.

Such an engine mounting may facilitate damping of turbine engine vibrations by means of shock absorbers working along the working direction of said engine mounting.

To achieve this, the longitudinal beam preferably comprises one or several shock absorbers arranged on a portion of the beam between the two arches mentioned above.

Said longitudinal beam advantageously supports an engine mounting with an actuator capable of modifying the inclination of the longitudinal axis of the turbine engine in said longitudinal plane.

A modification of the inclination of the longitudinal axis of the turbine engine can actually contribute to reducing noise nuisance of the turbine engine.

In the preferred embodiment of the invention, said longitudinal beam supports an additional arch offset along the longitudinal direction of the turbine engine, from said rigid mounting structure, and preferably centered relative to said longitudinal plane.

Said additional arch advantageously supports two lateral engine mountings arranged on each side of said longitudinal plane and designed to resist forces oriented along the vertical direction.

These engine mountings are preferably flexible, in other words they are elastic along the vertical direction.

Furthermore, the additional arch preferably supports a central engine mounting centered relative to said longitudinal plane and designed to resist at least forces along a transverse direction of the turbine engine.

"Transverse direction" means a direction orthogonal to said longitudinal plane.

This central engine mounting supported by the additional arch preferably comprises a shear pin with an approximately vertical axis fixed to one of the elements among the turbine engine and the additional arch, while being inserted in a hole formed in the other of these elements.

In the preferred embodiment of the invention, said central engine mounting supported by the additional arch is also designed to resist forces oriented along the longitudinal direction of the turbine engine.

As a variant, said rigid mounting structure may support an engine mounting at its distal end designed to resist forces applied along the longitudinal direction of the turbine engine.

Furthermore, said longitudinal beam preferably supports an engine mounting arranged on the longitudinal side of said rigid mounting structure opposite the additional arch, designed to resist at least forces oriented along the vertical direction.

In this case, the term "engine mounting" should be understood in the broad sense, including the case of a combination of several elements such as connecting rods working in separate directions but the combination of which can resist vertical forces.

In the preferred embodiment of the invention, such an engine mounting also resists the moment about the transverse direction, working in cooperation with lateral engine mountings supported by the additional arch.

Furthermore, in the preferred embodiment of the invention, said rigid mounting structure comprises an engine mounting at its distal end designed to resist forces applied along the transverse direction of the turbine engine.

As a variant, said engine mounting supported by said longitudinal beam and arranged on the longitudinal side opposite said additional arch, may also be designed to resist forces applied along the transverse direction of the turbine engine.

In general, said connecting means preferably comprise a plurality of mechanical energy dissipation elements connecting each above-mentioned arch to the turbine engine, said plurality of mechanical energy dissipation connecting elements comprising at least the distal connecting element described above, and one upper connecting element centered relative to said longitudinal plane.

Furthermore, the above-mentioned propulsion unit also advantageously comprises an external aerodynamic fairing.

"External aerodynamic fairing" means a fairing surrounded by relative wind circulating outside the propulsion unit.

This external aerodynamic fairing preferably comprises a structural skin that covers and is fixed to each arch connected to said rigid mounting structure, in which case said connecting means are sized such that a part of the connecting forces from the turbine engine to said rigid mounting structure passes through said structural skin of the aerodynamic external fairing.

Since some of the forces pass through the structural skin of the external aerodynamic fairing, the capacity of the above-mentioned connecting means to resist these forces may be reduced. The weight of elements such as arches, the additional arch and the longitudinal beam described above can thus be reduced.

Furthermore, the structural skin of the external aerodynamic fairing preferably extends as far as the distal end of each above-mentioned arch.

Preferably, this structural skin of the external aerodynamic fairing is connected to an upper aerodynamic skin that covers and is fixed onto at least part of said rigid mounting structure.

The invention also relates to an aircraft such as a plane, comprising at least one propulsion unit of the type mentioned above.

Preferably, each arch connected to said rigid mounting structure comprises a part extending above the turbine engine of said propulsion unit when said aircraft is parked on the ground.

Finally, the invention relates to a method for dismounting a turbine engine from a propulsion unit of an aircraft of the type described above, and a method of mounting a turbine engine initially placed on the ground, onto such a propulsion unit.

Each of these methods comprises a displacement of the turbine engine between a service position in which the turbine engine is mounted onto the mounting structure of said propulsion unit, and a dismounted position in which the turbine engine is placed on the ground.

According to the invention, said displacement is a translation along the vertical direction.

The turbine engine can be dismounted from its service position, and conversely can be connected to the mounting device from the ground, with a simple displacement of the turbine engine in translation along the vertical direction.

BRIEF DESCRIPTION OF THE DRAWINGS

The invention will be better understood and other details, advantages and characteristics of it will become clear after reading the following description given as a non-limitative example with reference to the appended drawings in which:

FIG. 2b is a diagrammatic perspective bottom view of the propulsion unit in FIG. 2a;

FIG. 3 is a diagrammatic perspective top view of a rigid mounting structure and a rigid substructure that form part of the mounting device of the propulsion unit in FIG. 2a;

FIGS. 9 and 10 are partial perspective diagrammatic views of the propulsion unit in FIG. 2a, at a larger scale, showing a forward upper engine mounting resisting vertical forces and a lateral engine mounting resisting transverse forces;

FIG. 11 is a partial diagrammatic view of the propulsion unit in FIG. 2a, seen from the aft part of the aircraft;

In all these figures, identical references may denote identical or similar elements.

DETAILED DESCRIPTION OF THE PREFERRED EMBODIMENTS

Figure 1:
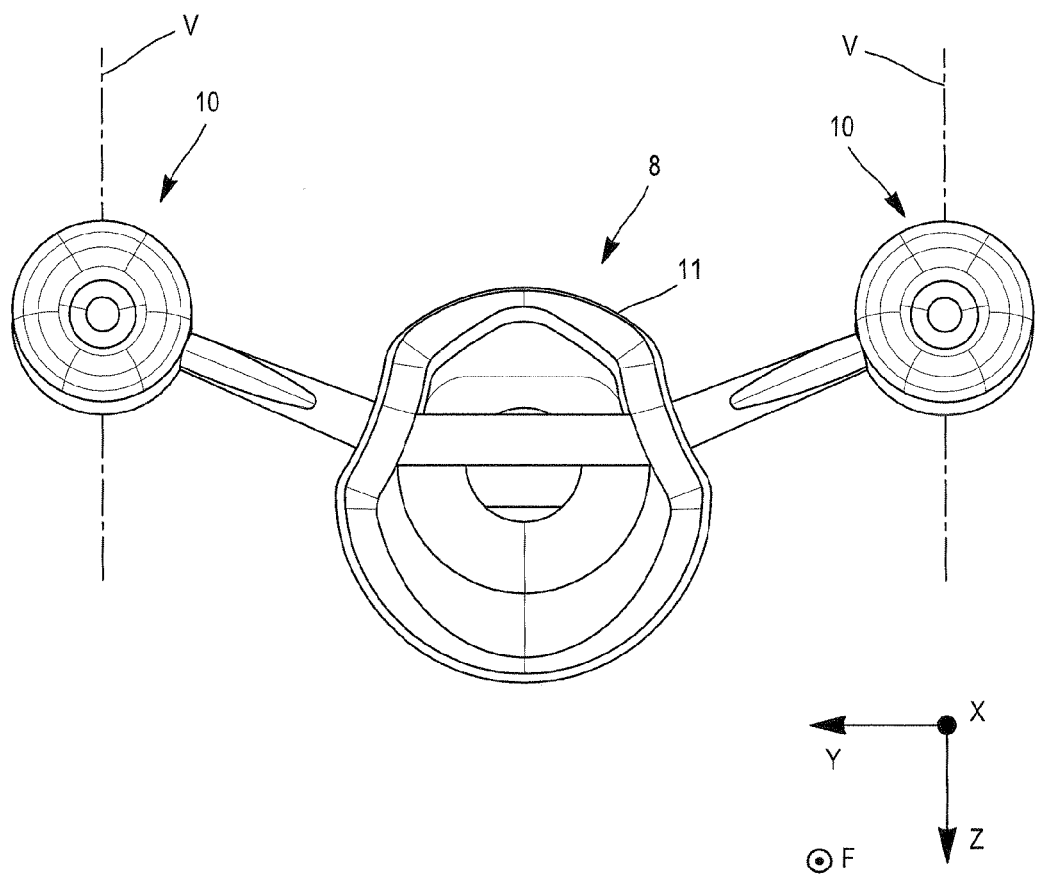
FIG. 1 is a diagrammatic cross-sectional view of an aft part of an aircraft fitted with two propulsion units according to one preferred embodiment of the invention, these propulsion units being added laterally onto the aircraft fuselage.

FIG. 1 very diagrammatically shows an aft part of an aircraft 8 such as a plane seen in a cross-sectional view comprising two propulsion units 10 added laterally on the aircraft fuselage 11. These propulsion units 10 are thus arranged aft from the main wings of the aircraft (not visible in FIG. 1).

Each propulsion unit 10 globally comprises a turbine engine 12 (FIG. 2b), a mounting device 14 fixing the turbine engine to an aircraft structure (FIGS. 2a and 2b), and an external aerodynamic fairing 16 that will guide the external airflow, also called the relative wind, around the turbine engine 12.

In the example shown, the turbine engine 12 is an open rotor pusher type turbojet, with propellers located in an aft part of the turbojet, these propellers not being shown in the figures.

Throughout the remainder of the description, by convention, X is the longitudinal direction of the turbine engine 12 and more generally of the propulsion unit 10 and the aircraft 8, this longitudinal direction X being parallel to a longitudinal axis 17 of the turbine engine 12. The Z axis is the direction of the height corresponding to the vertical direction when the aircraft 8 is parked on the ground or is in a zero roll position in flight, and Y is the transverse direction of the propulsion unit 10. The three directions X, Y and Z are orthogonal to each other.

Furthermore, the terms "forward" and "aft" should be considered relative to a direction of progress of the aircraft 8, shown diagrammatically by the arrow F.

The terms "distal" and "proximal" represent the fact that the element is far from or close to the aircraft fuselage respectively.

The mounting device 14 comprises a rigid mounting structure 18 and a leading edge fairing 20 and trailing edge fairing 22 that are added onto forward and aft ends of the rigid mounting structure 18 respectively.

The rigid mounting structure 18 has a proximal end 24 that will be connected laterally to the fuselage 11 of the aircraft 8, and an opposite distal end 26 that extends facing the turbine engine 12.

The mounting device 14 also comprises a rigid substructure 28 added to the distal end 26 of the rigid mounting structure 18.

The rigid mounting structure 18 comprises a forward spar 52, a median spar 54 and an aft spar 56, and three internal ribs 58 and a closing rib 60 (see FIG. 4). Thus, the rigid mounting structure 18 is in the form of a box.

In a manner known in itself, each of the above-mentioned spars is for example in the form of an I-shaped beam and thus comprises a web 61a extending approximately along a plane orthogonal to the longitudinal axis 17 of the turbine engine, a bottom flange 61b and a top flange 61c connected respectively to lower and upper edges of the web 61a and extending approximately along planes parallel to the longitudinal axis 17 of the turbine engine and orthogonal to the web 61a.

Figure 4A:
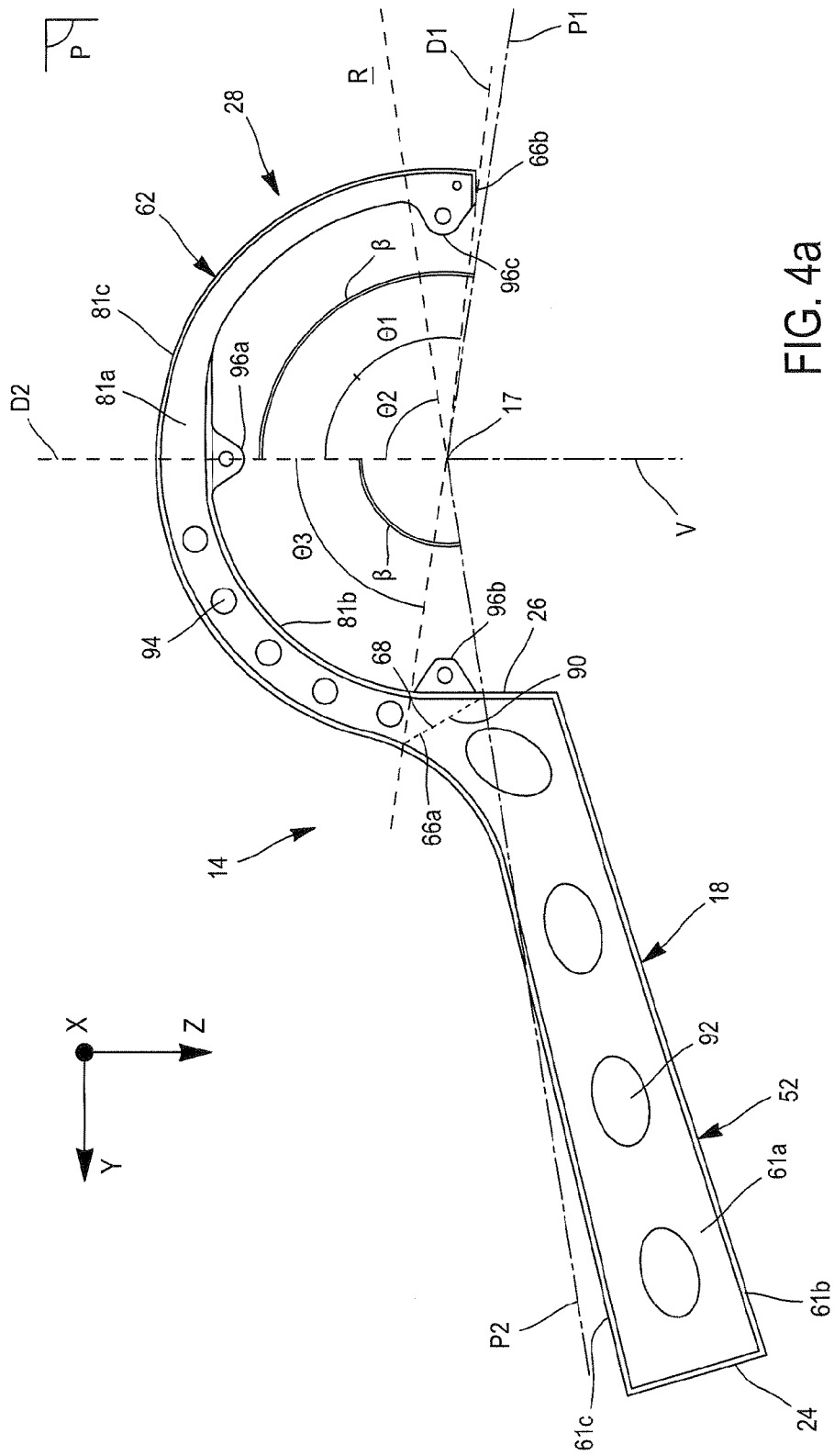
FIG. 4a is a cross-sectional diagrammatic view along plane P in FIG. 3, of a forward arch forming part of the rigid substructure in FIG. 3.

The rigid substructure 28 comprises two approximately identical arches, namely a forward arch 62 and an aft arch 64. These two arches have proximal ends 66a connected to distal ends 68 of the corresponding forward spar 52 and aft spar 56 mentioned above, and corresponding opposite distal ends 66b. These two arches 62 and 64 are curved elements each of which is concave towards the longitudinal axis 17 of the turbine engine, as can be seen in FIG. 4a.

The forward arch 62 continues beyond a longitudinal plane V (FIGS. 3, 4a) containing the longitudinal axis 17 and that will extend vertically when the aircraft 8 is parked on the ground. The circumferential extent of the forward arch 62 is quantified by an angle θ1 formed by two half-lines D1 and D2 each extending starting from the longitudinal axis 17. The first half-line D1 passes through the distal end 66b of the forward arch 62, while the second half-line D2 is contained in the longitudinal plane V and intercepts the forward arch 62.

The angle θ1 of the angular sector delimited by the two half-lines D1 and D2 is equal to approximately 100 degrees. This angle θ1 is preferably between 45 degrees and 120 degrees.

Figure 3:
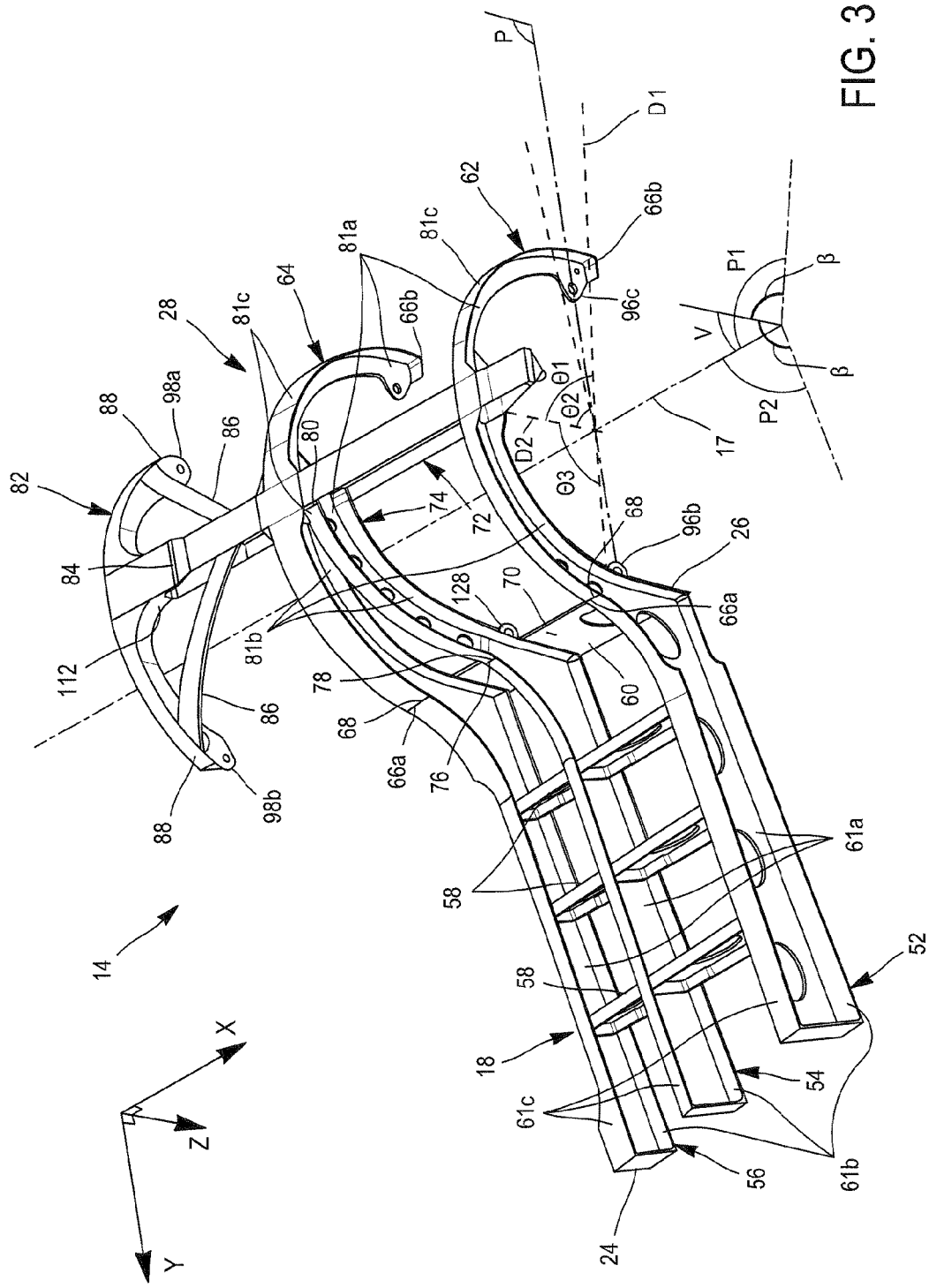

According to one variant, the circumferential extent of the forward arch 62 is quantified considering that a radially internal edge of the arch seen in section along the transverse plane P in FIG. 3, extends towards the distal end 66b of the arch from an upper edge 70 of the closing rib 60 of the rigid mounting structure 18. The radially internal edge of the forward arch 62 thus defined has a circumferential extent equal to about 200 degrees about the longitudinal axis 17 of the turbine engine.

The properties described above concerning the forward arch 62 are obviously valid for the aft arch 64.

The rigid substructure 28 also comprises a longitudinal beam 72 (FIG. 3) centered relative to the longitudinal plane V. This longitudinal beam 72 is embedded in a median portion of each of the forward 62 and aft 64 arches.

The rigid substructure 28 also comprises a median half-arch 74 with a proximal end 76 connected to a distal end 78 of the median spar 54 of the rigid mounting structure 18, and a distal end 80 connected to a lateral side of the longitudinal beam 72. This median half-arch 74 is shaped such that its distal end 80 is offset along the aft direction from its proximal end 76.

Each of the forward 62 and aft 64 arches comprises a web 81a extending along the line of the web 61a of the corresponding spar 52, 56 and an inner flange 81b and an outer flange 81c connected to the inside and outside edges respectively of the web 81a of the arch. The outer flange 81c of each of the arches 62, 64 extends along the line of the upper flange 61c of the corresponding spar 52, 56 to the distal end 66b of the arch, while the inner flange 81b of the arch extends along the line of the upper edge 70 of the closing rib 60 of the rigid mounting structure 18 as far as the longitudinal beam 72. The web 61a of each arch is thus in a transverse plane, while the inner flange 81b and the outer flange 81c of each arch are approximately in the shape of a portion of a cylinder of revolution about the longitudinal axis 17.

Similarly, the median half-arch 74 comprises a web 81a extending along the line of the web 61a of the median spar 54, and an inner flange 81b and an outer flange 81c connected to the inner and outer edges respectively of the web 81a of the arch. The outer flange 81c of the median half-arch 74 extends in line with the upper flange 61c of the median spar 54 as far as the longitudinal beam 72, and the inner flange 81b of the median half-arch extends along the upper edge 70 of the closing rib 60 of the rigid mounting structure 18, also as far as the longitudinal beam 72.

The rigid substructure 28 also comprises an additional arch 82 added onto an aft end 84 of the longitudinal beam 72 and forming an aft end of the rigid substructure 28. As shown in FIG. 3, the additional arch 82 is offset in the aft direction from the rigid mounting structure 18, and extends over about 60 degrees about the longitudinal axis 17 of the turbine engine, being centered relative to the longitudinal plane V.

As can be seen in FIG. 3, the rigid substructure 28 also comprises two stiffener arches 86 that connect two opposite lateral ends 88 of the additional arch 82 to the longitudinal beam 72.

The forward arch 62 and the forward spar 52 are preferably made of metal and are fixed to each other by electron welding of their corresponding proximal end 66a and distal end 68, in a welding zone 90 (FIG. 4a).

As a variant, the forward arch 62 and the forward spar 52 may be fixed to each other by other means, for example by splicing.

These features of the forward arch 62 and the forward spar 52 are also applicable to the aft arch 64 and to the aft spar 56, and to the median half-arch 74 and to the median spar 54.

As can be seen in FIG. 4a, the forward spar 52 comprises openings 92 to reduce the weight of the spar. The forward arch 62 also comprises openings 94 distributed in a proximal half of the arch.

Furthermore, the forward arch 62 comprises three clevises projecting radially inwards from the longitudinal axis 17 of the turbine engine and designed for mounting energy dissipation elements as will become clearer in the following description. One of these clevises 96a is located at the vertex of the forward arch 62 while the other two clevises 96b and 96c are located at the proximal end and distal end respectively of the arch so as to be diametrically opposite to each other on opposite sides of the longitudinal axis 17 of the turbine engine.

Figure 4B:
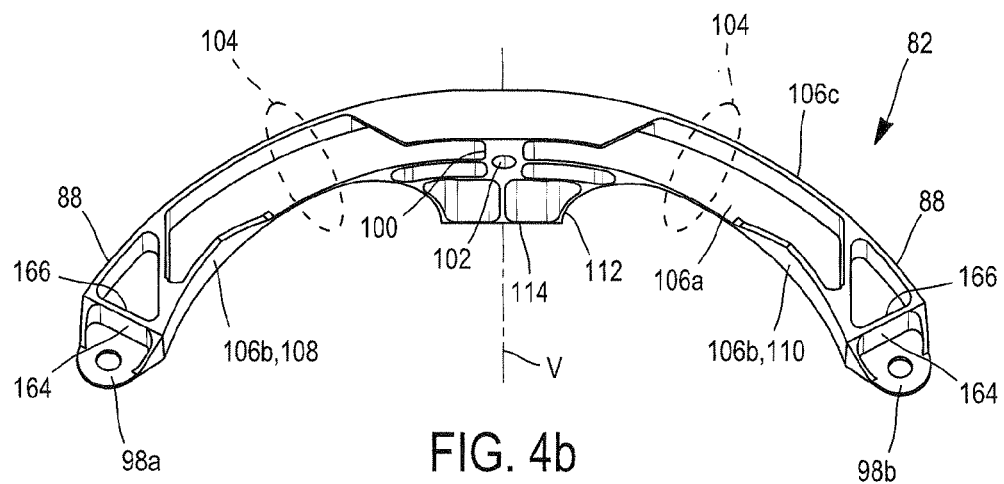
FIG. 4b is a diagrammatic perspective view of an additional arch forming part of the rigid substructure in FIG. 3.

The additional arch 82 is shown in more detail in FIG. 4b. It comprises two clevises 98a and 98b forming the opposite lateral ends respectively of the additional arch 82, each designed for the attachment of a corresponding engine mounting. The additional arch 82 also comprises a portion 100 of the aft central engine mounting that is centered relative to the longitudinal plane V and that essentially comprises a hole 102 with a vertical axis into which a force transmission pin will be fitted, as will become clearer in the following.

The additional arch 82 is preferably made from a metallic material and is advantageously formed from three segments assembled end to end, for example by an electron beam welding technique in welding zones 104 roughly shown in FIG. 4b. As a variant, these segments may be attached by splicing.

In the example shown, the additional arch 82 is approximately in the shape of an I section and it is composed principally of a web 106a extending approximately along a plane orthogonal to the longitudinal axis 17 of the turbine engine, and an inner flange 106b and an outer flange 106c connected to the inner and outer edges respectively of the web 106a of the additional arch 82 and in the form of portions of a cylinder of revolution with axes coincident with the longitudinal axis 17 of the turbine engine. In this example, the outer flange 106c extends continuously from one end of the additional arch 82 to the other, while the inner flange 106b comprises two disconnected portions 108 and 110 extending from the two opposite ends of the additional arch towards a median part of the arch.

Furthermore, as can be seen in FIGS. 3 and 4b, the additional arch 82 comprises a connector portion 112 formed projecting in the forward direction along the axial direction from the portion 100 of the aft central engine mounting integrated into this additional arch. This connector portion 112 has a plane end face 114 extending orthogonally to the longitudinal axis 17 of the turbine engine, that will be fixed on a corresponding end face of the longitudinal beam 72 such that the connector portion 112 mentioned above extends said beam.

Furthermore, the external aerodynamic fairing 16 comprises a structural skin 30a (FIGS. 2a, 2b, and 5) that has an approximately semi-cylindrical aerodynamic shape of revolution, and which is fixed on the rigid substructure 28.

It should be noted that the structural skin 30a is concave towards the direction of the longitudinal axis 17 of the turbine engine 12 when the propulsion unit 10 is seen in section along a transverse plane, in other words orthogonal to the longitudinal direction X, like the transverse plane P visible in FIG. 3.

In the example shown, the structural skin 30a has a circumferential extent equal to about 190 degrees about the longitudinal axis 17 when the propulsion unit 10 is seen in section in a transverse plane such as the plane P in FIG. 3. More generally, this circumferential extent is preferably between 90 degrees and 230 degrees.

Preferably, the structural skin 30a is arranged so that most of it is above the longitudinal axis 17 of the turbine engine when the aircraft 8 is parked on the ground. More precisely, this structural skin 30a is preferably entirely included in a region R of the space delimited by two half planes P1, P2 each delimited by the longitudinal axis 17 and extending symmetrically on each side of the longitudinal plane V, as can be seen in FIG. 4a. Under these conditions, said region R of the space will extend above the half planes P1, P2. Furthermore, each of the half planes P1, P2 forms an angle β that is advantageously less than 120 degrees with the longitudinal plane V. In the example shown, the angle β is thus equal to about 105 degrees.

Figure 2A:
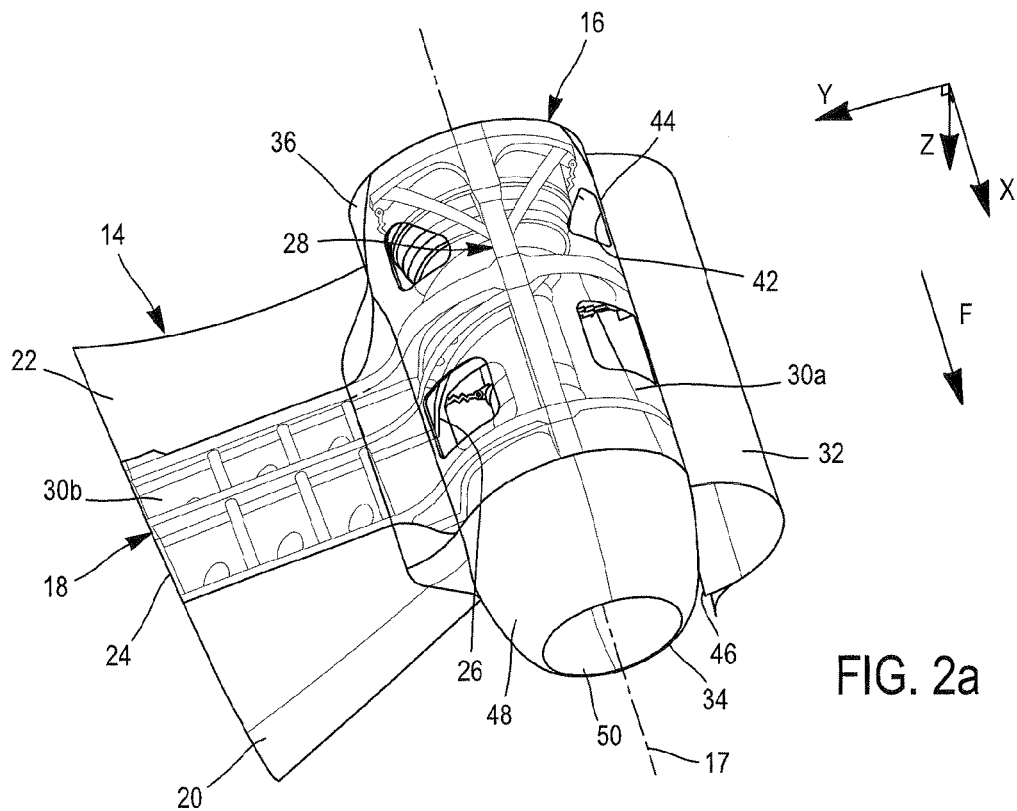
FIG. 2a is a diagrammatic perspective top view of one of the propulsion units of the aircraft in FIG. 1, this propulsion unit comprising a turbine engine, a mounting device for this turbine engine, and an external aerodynamic fairing.
Figure 2B:
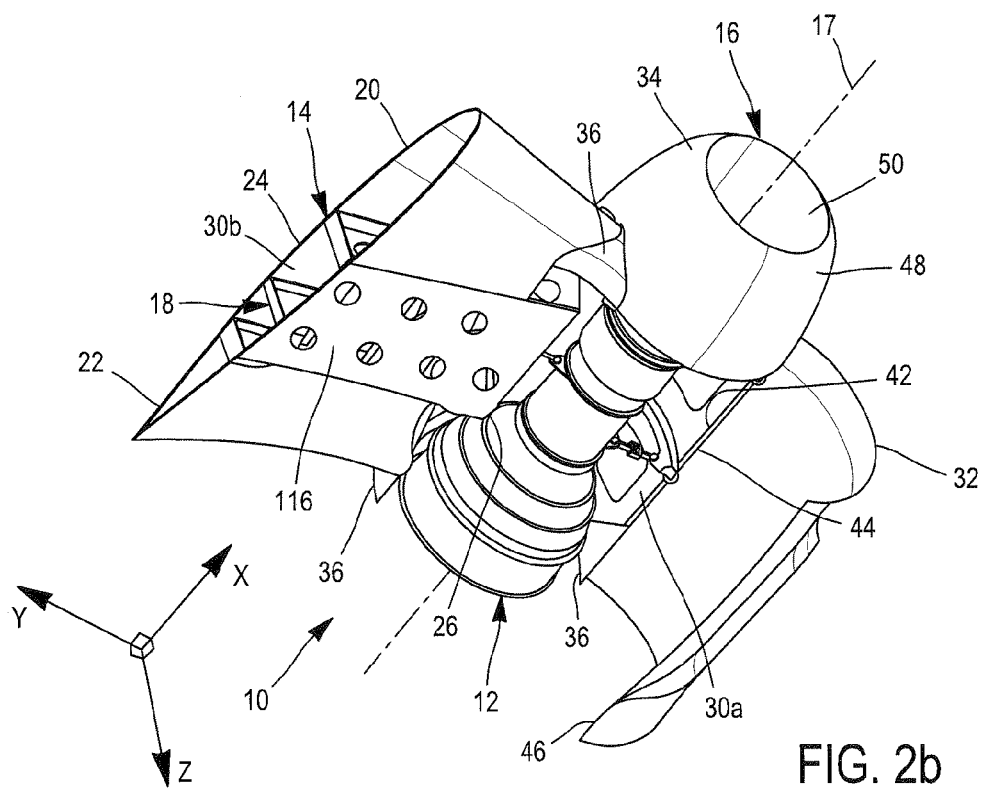
Figure 5:
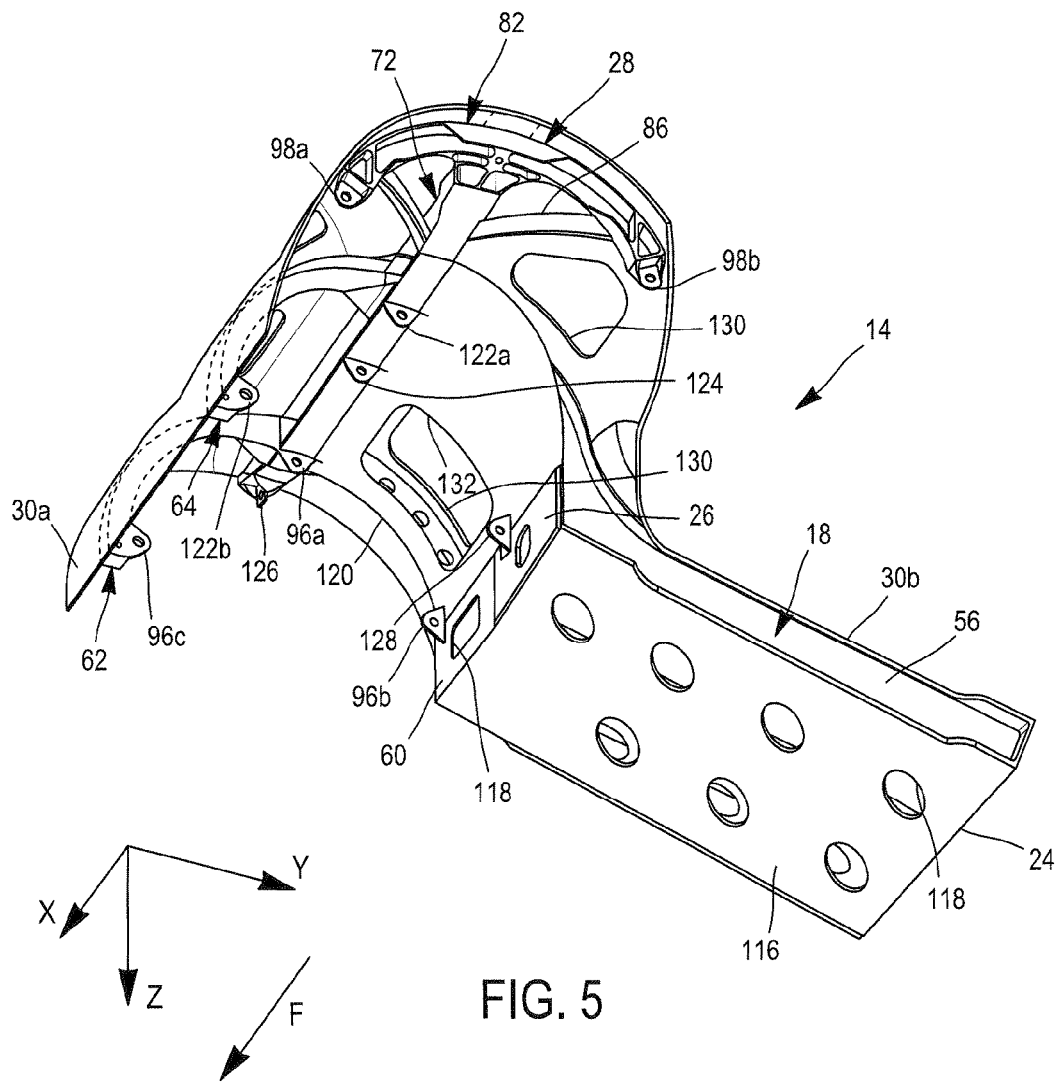
FIG. 5 is a partial diagrammatic perspective bottom view of the mounting device of the propulsion unit in FIG. 2a, to which a structural skin of the external aerodynamic fairing of this propulsion unit has been added.

The mounting device 14 also comprises an upper aerodynamic skin 30b with an approximately plane aerodynamic shape extending laterally along a line of the structural skin 30a mentioned above so as to cover an upper face of the rigid mounting structure 18 (FIGS. 2a, 2b, and 5).

The structural skin 30a and the upper aerodynamic skin 30b are made from a composite thermosetting or thermoplastic type material, but as a variant may be made from metal. In the case of a thermosetting material, these skins may be made in particular using an automatic layup machine using a method known to those skilled in the art for manufacturing single or double curvature fuselage panels.

Apart from the structural skin 30a, the external aerodynamic fairing 16 also comprises a lower cowling 32, an air inlet 34 and complementary panels 36 (FIGS. 2a and 2b).

The lower cowling 32 comprises a distal end 42 articulated onto a distal end 44 of the rigid substructure 28 and a proximal end 46 provided with connecting means to the rigid mounting structure 18. The lower cowling 32 can thus be changed over from an open position shown in FIGS. 2a and 2b in which the proximal end 46 of the lower cowling is detached from the rigid mounting structure 18, to a closed position in which the proximal end 46 of the lower cowling is connected to this rigid mounting structure 18.

The air inlet 34 is connected to a forward end of the rigid substructure 28. This air inlet 34 comprises a globally annular outer skin 48 centered relative to the longitudinal axis 17 of the turbine engine and prolonging the structural skin 30a and the lower cowling 32 when the lower cowling is in the closed position. The air inlet 34 also comprises a globally annular inner skin delimiting the outside of an air inlet conduit into the turbine engine 12.

Each of the complementary panels 36 mentioned above is connected to one or several elements of the mounting device 14, including the structural skin 30a, the leading edge fairing 20 and the trailing edge fairing 22, the lower cowling 32 and the air inlet 34, so as to fill in the spaces between these elements.

Furthermore, the structural skin 30a is mounted on the rigid substructure 28 by bolting or riveting this structural skin 30a onto the outer flanges 81c, 106c of the arches 62, 64, of the half-arch 74 and the additional arch 82 of the rigid substructure 28, respectively.

Similarly, the upper aerodynamic skin 30b is fixed onto the rigid mounting structure 18 by bolting or riveting of this upper aerodynamic skin 30b onto the corresponding upper flanges 61c of the spars 52, 54, 56 of the rigid mounting structure 18.

The elements forming the rigid substructure 28, and particularly the forward arch 62 and aft arch 64 and the longitudinal beam 72 and the median half-arch 74 are sized such that some of the forces induced by the turbine engine 12 are transmitted from this turbine engine to the rigid mounting structure 18 through the structural skin 30a of the outer aerodynamic fairing 16. This design is thus intended to limit the stiffness of elements forming the rigid substructure 28, for example by limiting the cross section of these elements and/or by limiting the Young's modulus by an appropriate choice of the material(s) from which these elements are made. Furthermore, the above-mentioned elements that form the rigid substructure 28 and the rigid mounting structure 18 are sized such that some of the forces induced by the turbine engine 12 are transmitted to the rigid mounting structure 18 through the upper aerodynamic skin 30b.

As shown in FIG. 5, the underside of the rigid mounting structure 18 is covered by fairing consisting of a lower aerodynamic skin 116 of the mounting device 14, fixed on the corresponding lower flanges 61b of the spars of the rigid mounting structure 18. This lower skin 116 is provided with inspection openings 118 allowing access inside the propulsion unit 10 and provided with removable covers not shown in the figures. The closing rib 60 of the rigid mounting structure 18 also comprises such inspection openings 118.

Furthermore, the mounting device 14 comprises an inner skin 120 fixed on the corresponding inner flanges 81b of the forward arch 62 and the aft arch 64 and the median half-arch 74. This inner skin 120 forms a stiffening panel that participates in stiffening the rigid substructure 28.

The connection between the rigid substructure 28 and the turbine engine 12 is made by a plurality of first devises used for mounting mechanical energy dissipation elements, called shock absorbers in the following, and a plurality of second clevises for attachment of engine mountings as well as the portion 100 of the aft central engine mounting integrated into the additional arch 82.

The plurality of first clevises includes the three clevises 96a, 96b, 96c in the forward arch 62, already described, and two clevises supported by the aft arch 64, one 122a of which is located at the vertex of the arch while the other 122b is located at the distal end 66b of the arch, and another clevis 124 supported by the longitudinal beam 72 and located between the forward arch 62 and the median half-arch 74. The axis of each of these first clevises is parallel to the longitudinal axis 17 of the turbine engine.

It should be noted that the first clevises 96c and 122b that form part of the forward arch 62 and the aft arch 64 respectively form distal mounting parts located on the same side as the distal end 66b of each arch relative to the longitudinal plane V, using the terminology applicable for the invention.

As can be seen in FIG. 4a, each of the distal mounting parts 96c and 122b mentioned above extends outside an angular sector with angle θ2 equal to about 80 degrees extending from the second half-line D2 described above towards the distal end 66b of the corresponding arch. The above-mentioned angle θ2 is preferably between 25 degrees and 100 degrees.

Furthermore, using to the terminology applicable for the invention, the first clevis 96b forming part of the forward arch 62 forms a proximal mounting part arranged on the same side as the proximal end 66a of the arch and the rigid mounting structure 18 relative to the longitudinal plane V.

FIG. 4a shows the above-mentioned proximal mounting part 96b extending outside an angular sector with angle θ3 equal to about 80 degrees and extending from the second half-line D2 towards the rigid mounting structure 18. The above-mentioned angle θ3 is preferably between 25 degrees and 100 degrees.

The plurality of second clevises includes the two clevises 98a and 98b forming the ends of the additional arch 82, and a clevis 126 supported by the longitudinal beam 72 and located approximately at the forward end of this beam, and a clevis 128 supported jointly by the proximal end of the median half-arch 74 and by the distal end 78 of the median spar 54. Each second clevis has an axis parallel to the longitudinal axis 17 of the turbine engine, except for the clevis 126 located in the forward part of the longitudinal beam 72, that has an axis parallel to the transverse direction Y.

Each of the first and second clevises mentioned above extends projecting radially inwards towards the longitudinal axis 17 of the turbine engine.

Figure 6:
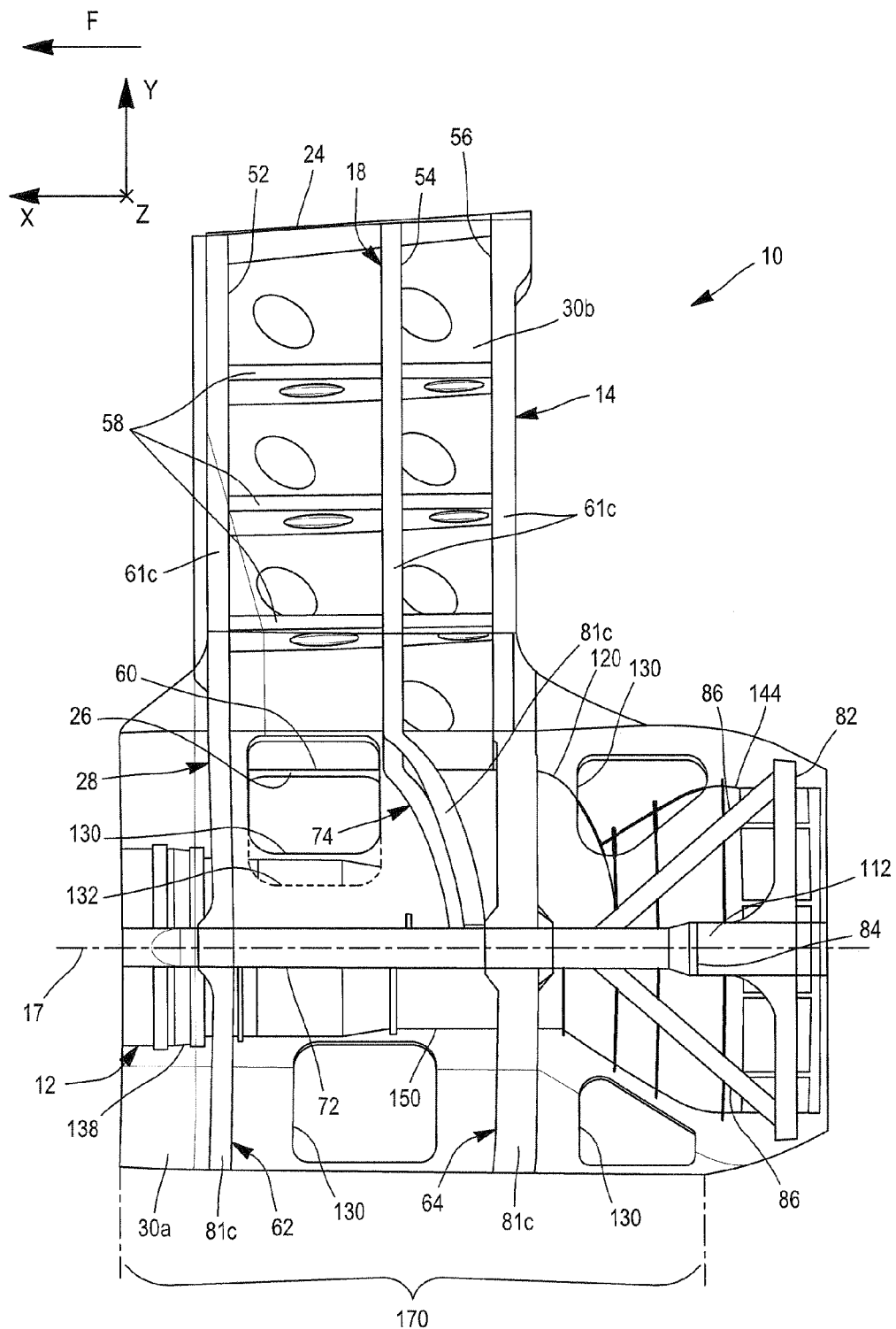
FIG. 6 is a partial diagrammatic top view of the mounting device of the propulsion unit in FIG. 2a, to which the structural skin of said external aerodynamic fairing has been added.

As can be seen in FIG. 6, the structural skin 30a comprises inspection openings 130, for example four inspection openings. These inspection openings are provided with removable covers not shown in the figures. One of these inspection openings is formed facing an inspection opening 132 formed in the inner skin 120 of the mounting device 14 and can also be seen in FIG. 5.

The manner in which the turbine engine 12 is connected to the mounting device 14 will now be described with reference to FIGS. 7 to 12.

In these figures, the engine mountings and the energy dissipation elements for connection of the turbine engine 12 to the rigid substructure 28 and the rigid mounting structure 18 are shown by functional symbols unrelated to the geometry of these elements, considering that these elements may be of a known type, so that their structure will not be described in detail in the following.

Figure 7:
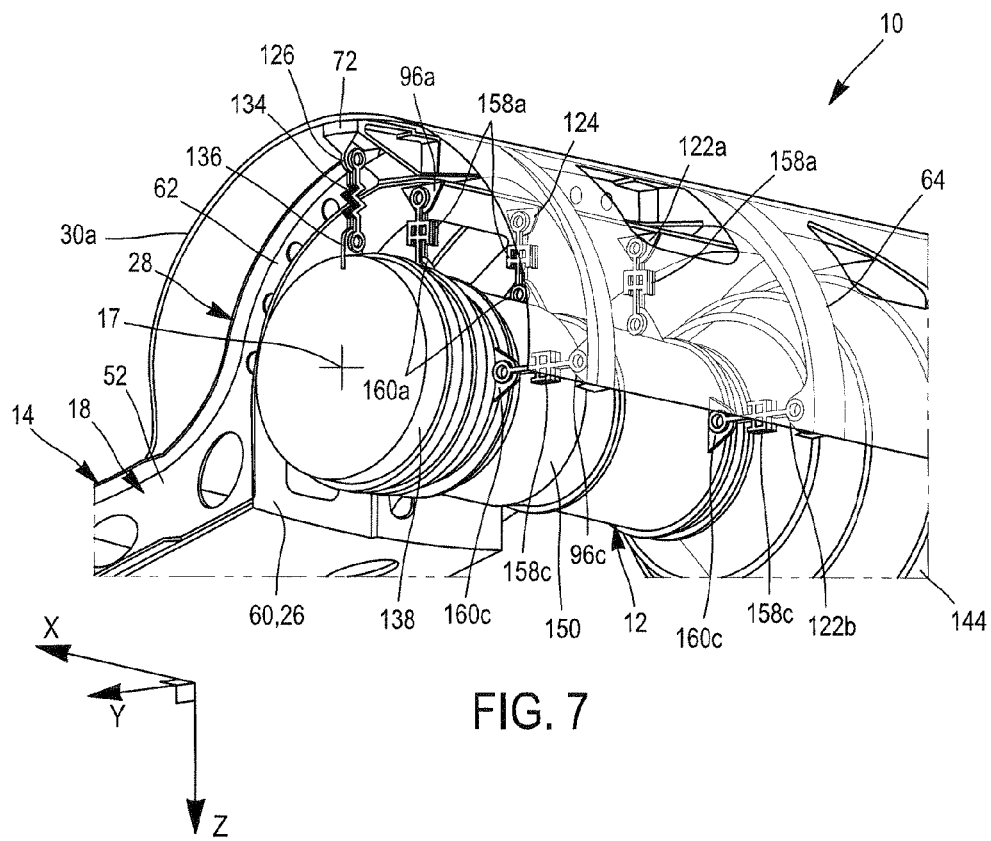
FIGS. 7 and 8 are partial perspective diagrammatic views of the propulsion unit in FIG. 2a seen from the front of the aircraft.
Figure 8:
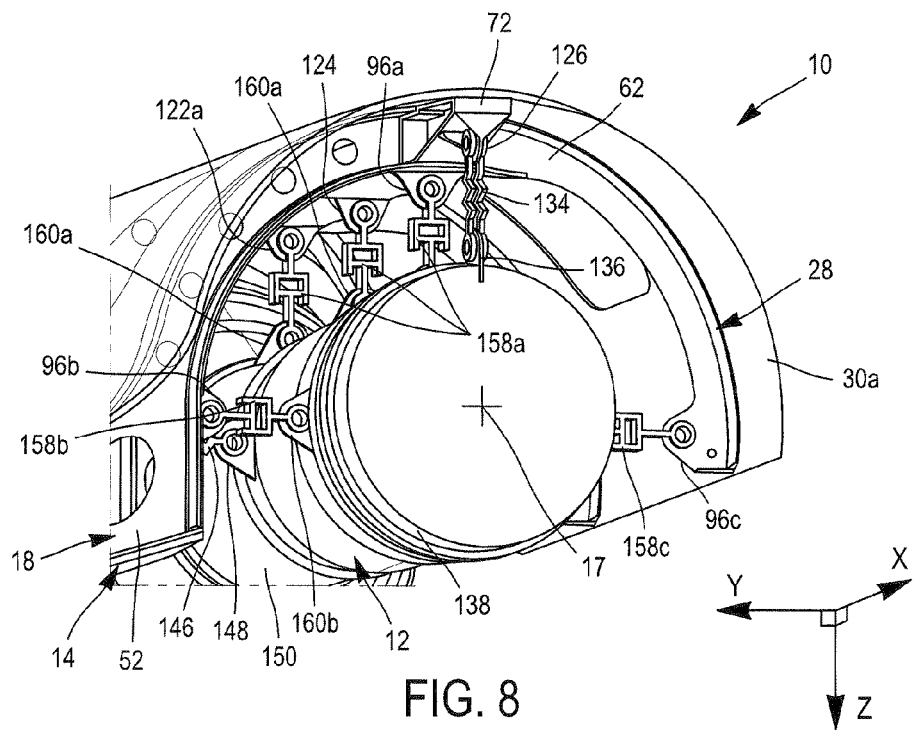

FIGS. 7 to 9 show firstly a forward upper engine mounting 134 connecting the clevis 126 supported by the forward end of the longitudinal beam 72 to a similar clevis 136 supported by a forward casing 138 of the turbine engine 12. Mounting of this forward upper engine mounting 134 onto the clevises 126 and 136 is such that this engine mounting transmits only forces oriented along the vertical direction Z to the rigid substructure 28. To achieve this, the forward upper engine mounting 134 is connected to each of the above-mentioned clevises 126, 136 using a ball joint.

Forces along the vertical direction Z are also resisted by two aft lateral engine mountings 140a and 140b that can be seen in FIG. 11, connecting the clevises 98a and 98b forming the lateral ends of the additional arch 82, to clevises 142a and 142b respectively with axes parallel to the longitudinal axis 17 of the turbine engine 12 and formed on an aft casing 144 of this turbine engine, projecting radially outwards. These aft lateral engine mountings 140a and 140b are also connected to the above-mentioned clevises through ball joints to prevent any resistance to forces oriented along the longitudinal X and transverse Y directions.

FIGS. 8 and 10 show a forward lateral engine mounting 146 connecting the clevis 128 supported by the proximal end of the median half-arch 74 to a clevis 148 with axis parallel to the longitudinal axis 17 of the turbine engine and formed on a casing 150 of the turbine engine 12 placed between the forward casing 138 and the aft casing 144 mentioned above, projecting radially outwards. Mounting of this forward lateral engine mounting 146 onto the clevises 128 and 148 is such that this engine mounting only transmits forces along the transverse Y direction to the rigid substructure 28 and to the rigid mounting structure 18. To achieve this, this forward lateral engine mounting 146 is connected to clevises 128 and 148 through ball joints.

For example, engine mountings 134, 140a, 140b and 146 described above are in the form of connecting rods or shackles.

Furthermore, these engine mountings are preferably of the so-called flexible type, in other words they include elastic means allowing relative displacement of the ends of the engine mounting.

The forces along the transverse Y direction are also resisted by an aft central engine mounting 152 (FIG. 11) comprising the engine mounting portion 100 integrated to the additional arch 82, and a fitting 154 formed on part of the vertex of the aft casing 144 and fitted with a shear pin 156 with a vertical axis passing through the longitudinal axis 17 of the turbine engine. This shear pin 156, commonly called a spigot, extends projecting upwards and its upper part is inserted so as to fit in the hole 102 (FIG. 4b) of the engine mounting portion 100 integrated into the additional arch 82. The tight fit of the shear pin 156 in the hole 102 means that the aft central engine mounting 152 resists not only the above-mentioned transverse forces but also thrust forces of the turbine engine 12, in other words forces along the longitudinal direction X. The shear pin 156 is mounted with some play along the axis of the hole 102 so as to prevent the resistance of forces along the vertical direction Z. Furthermore, the hole 102 is formed in a ball joint (not shown in the figures), itself integrated into the portion 100 of the engine mounting integrated into the additional arch 82. Such a ball joint connection prevents the transmission of forces or moments related to a rotation of the shear pin 156.

Furthermore, the moment along the vertical direction Z is resisted jointly by the forward lateral engine mounting 146 and by the aft central engine mounting 152.

The moment about the transverse direction Y is resisted jointly by the forward upper engine mounting 134 and by the aft lateral engine mountings 140a and 140b.

Finally, the moment about the longitudinal direction X is resisted by the aft lateral engine mountings 140a and 140b.

As can be seen in FIGS. 7 and 8, six mechanical energy dissipation elements 158a, 158b, 158c, or shock absorbers intended to absorb vibrations of the turbine engine 12, connect the clevises 96a, 96b, 96c, 124, 122a, 122b supported by the rigid substructure 28 to clevises 160a, 160b, 160c respectively located on the casings 138 and 150 of the turbine engine 12.

Each of the two shock absorbers 158c connected to the clevis 96c arranged at the distal end 66b of the forward arch 62 and to the clevis 122b arranged at the distal end 66b of the aft arch 64 respectively forms a distal connecting element connecting the turbine engine to the corresponding arch, in the terminology specific to the invention.

Similarly, the shock absorber 158b connected to the clevis 96b arranged at the proximal end of the forward arch 62 forms a proximal connecting element that connects the turbine engine to the forward arch 62.

Figure 12:
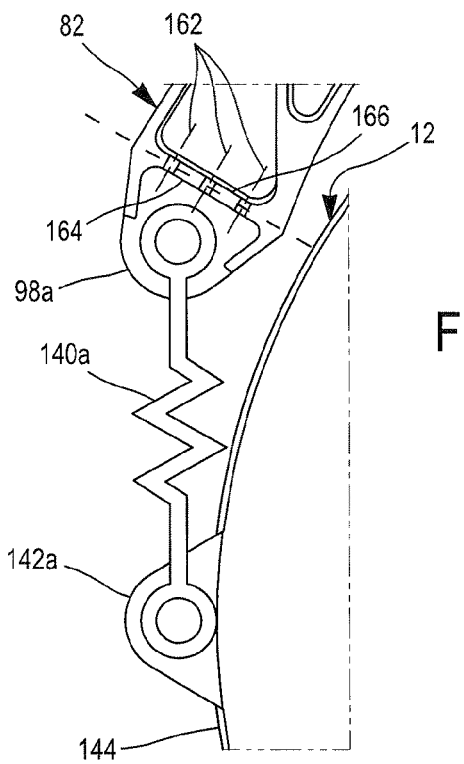
FIG. 12 is a partial diagrammatic view of detail XII in FIG. 11 at a larger scale, showing an aft lateral engine mounting resisting vertical forces.

As shown in FIG. 12, the clevis 98a that forms one of the ends of the additional arch 82 and that is used for attachment of the aft lateral engine mounting 140a, is fixed onto the additional arch 82 by removable attachment elements such as bolts, of which only the corresponding axes 162 are shown. The same applies for the clevis 98b forming the other end of the additional arch 82. To achieve this, each of these two clevises 98a, 98b has a plate 164 applied onto an end plate 166 of the additional arch 82, these plates that can also be seen in FIG. 4b comprise corresponding orifices aligned to enable the passage of the above-mentioned bolts.

The other clevises 126 and 128 supported by the rigid substructure 28 and that will be used for the attachment of engine mountings are also fixed onto the corresponding element of this rigid substructure by removable attachment means.

The method of attachment by removable attachment means of the clevises designed for attachment of the engine mountings enables attachment/detachment of the turbine engine 12 to/from the mounting device 14 by mounting/dismounting the corresponding clevis of each engine mounting to/from the rigid substructure 28, rather than by mounting/dismounting the pins of each engine mounting.

Similarly, the clevises 96a-96c, 122a, 122b, and 124 that are designed for the attachment of shock absorbers 158, are preferably also fixed to the corresponding element of the rigid substructure 28 by removable attachment means.

It should be noted that all of the engine mountings 134, 140a, 140b, 146, 152 and shock absorbers 158 and the rigid substructure 28 jointly form means of connecting the turbine engine 12 to the rigid mounting structure 18, in the terminology specific to the invention.

Figure 13:
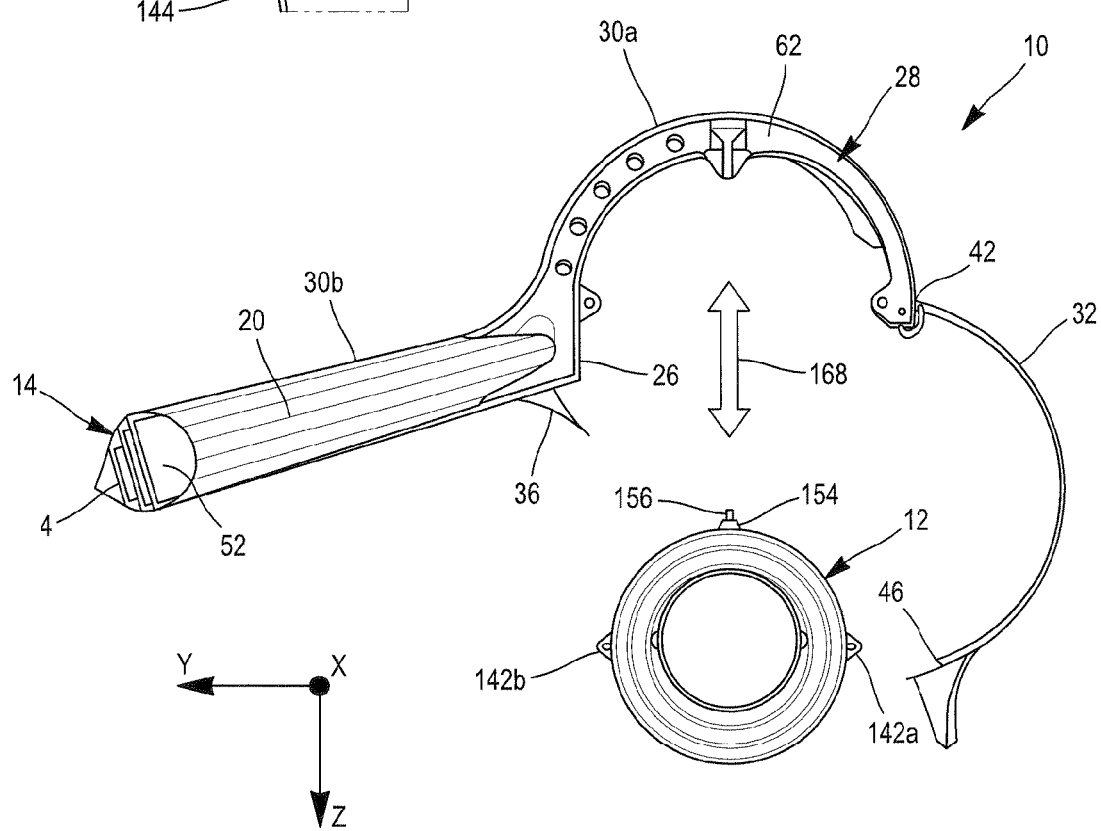
FIG. 13 is a partial diagrammatic view from the forward part of the aircraft, of the propulsion unit in FIG. 2a, showing a method of dismounting the turbine engine from this propulsion unit.

As shown diagrammatically in FIG. 13, the turbine engine 12 may be mounted onto the mounting device 14 and dismounted from it by displacement of the turbine engine 12 in translation only along the vertical direction, symbolically shown by the arrow 168. It should be noted that the turbine engine 12 is shown without its engine mountings 134, 140a and 140b in FIG. 13, for reasons of clarity.

Therefore, this method of mounting and dismounting the turbine engine has the advantage that it does not require several successive translations along different directions, and is facilitated by the fact that the means of connecting the turbine engine 12 to the rigid mounting structure 18 are entirely located within the region R of space defined above (FIG. 4*a*).

In particular, it should be noted that no engine mounting is connected to a lower part of the turbine engine 12. The same applies for the shock absorbers 158. More precisely, none of the engine mountings is entirely located within a half-space defined under a plane passing through the longitudinal axis 17 and parallel to the transverse direction Y. All engine mountings are located within a defined half space above the above-mentioned plane, except for the forward lateral engine mounting 146 that is shared by the above-mentioned plane into two parts approximately symmetric with each other.

Furthermore, FIG. 6 shows a zone 170 commonly called the "UERF" zone defined as the zone that could be impacted by a blade of the turbine engine 12 in case such a blade is torn off.

It can be seen in this FIG. 6 that the additional arch 82 is located outside the UERF zone 170. Consequently, the aft lateral engine mountings 140*a*, 140*b* and the aft central engine mounting 152 are protected from the impact of a blade.

Furthermore, since the forward upper engine mounting 134 is designed to resist vertical forces only, this engine mounting has some play along the transverse direction Y at the devises 126 and 136 (FIG. 9) to which this engine mounting is connected. However, if the forward lateral engine mounting 146 that will resist transverse forces and participate in resisting the moment about the vertical direction Z should accidentally be destroyed, the forward upper engine mounting 134 naturally tends to stop in contact with the clevises 126 and 136 as it displaces along the transverse direction Y, and thus substitutes for the deficient engine mounting to resist the moment about the vertical direction Z jointly with the aft lateral engine mountings 140*a* and 140*b* located outside the UERF zone 170.

Similarly, the forward lateral engine mounting 146 that will resist forces along the transverse direction Y has some play along the vertical direction Z at the clevises 128 and 148 (FIG. 10) to which this engine mounting is connected. However, if the forward upper engine mounting 134 that will resist vertical forces and participate in resisting the moment about the transverse direction Y should be accidentally destroyed, the forward lateral engine mounting 146 naturally tends to stop in contact with the clevises 128 and 148 as it displaces vertically, and thus substitutes for the defective engine mounting to resist the moment about the transverse direction Y jointly with the aft lateral engine mountings 140*a* and 140*b* located outside the UERF zone 170.

The configuration of the propulsion unit 10 thus satisfies the regulatory requirements regarding the risk of the loss of blade, while avoiding the use of additional "failsafe" engine mountings that do not participate in resisting forces during normal operation of the turbine engine.

As a variant, the spars 52, 54, 56 and/or the ribs 58, 60 of the rigid mounting structure 18 may be made of a composite material rather than metal.

As another variant, the rigid mounting structure 18 does not necessarily comprise spars and ribs but may be made of a honeycomb structure, or it may be formed from a solid foam.

Furthermore, the structural skin 30*a* may have a circumferential extent less than the circumferential extent of the rigid substructure 28. This rigid substructure is then only partially covered by the structural skin 30*a*.

Furthermore, although the lower cowling 32 described above only performs an aerodynamic function and does not participate in the transmission of forces induced by the turbine engine, as a variant it would be possible to design this lower cowling 32 and the component elements of the mounting device 14 such that the lower cowling 32 does play a structural role, in other words it does participate in the transmission of forces induced by the turbine engine, particularly in transmission of the torsion moment about the longitudinal direction X.

Furthermore, the engine mounting portion 100 containing the hole 102 is not necessarily integrated into the additional arch 82 but it may be in the form of a fitting added on this additional arch and including the hole 102.

Furthermore, the forward upper engine mounting 134 may be replaced or extended by a linear actuator to modify the inclination of the longitudinal axis of the turbine engine 12 along the horizontal direction. Such a modification of the inclination is facilitated by the fact that the aft central engine mounting 152 comprises a ball joint, as explained above.

Figure 14:
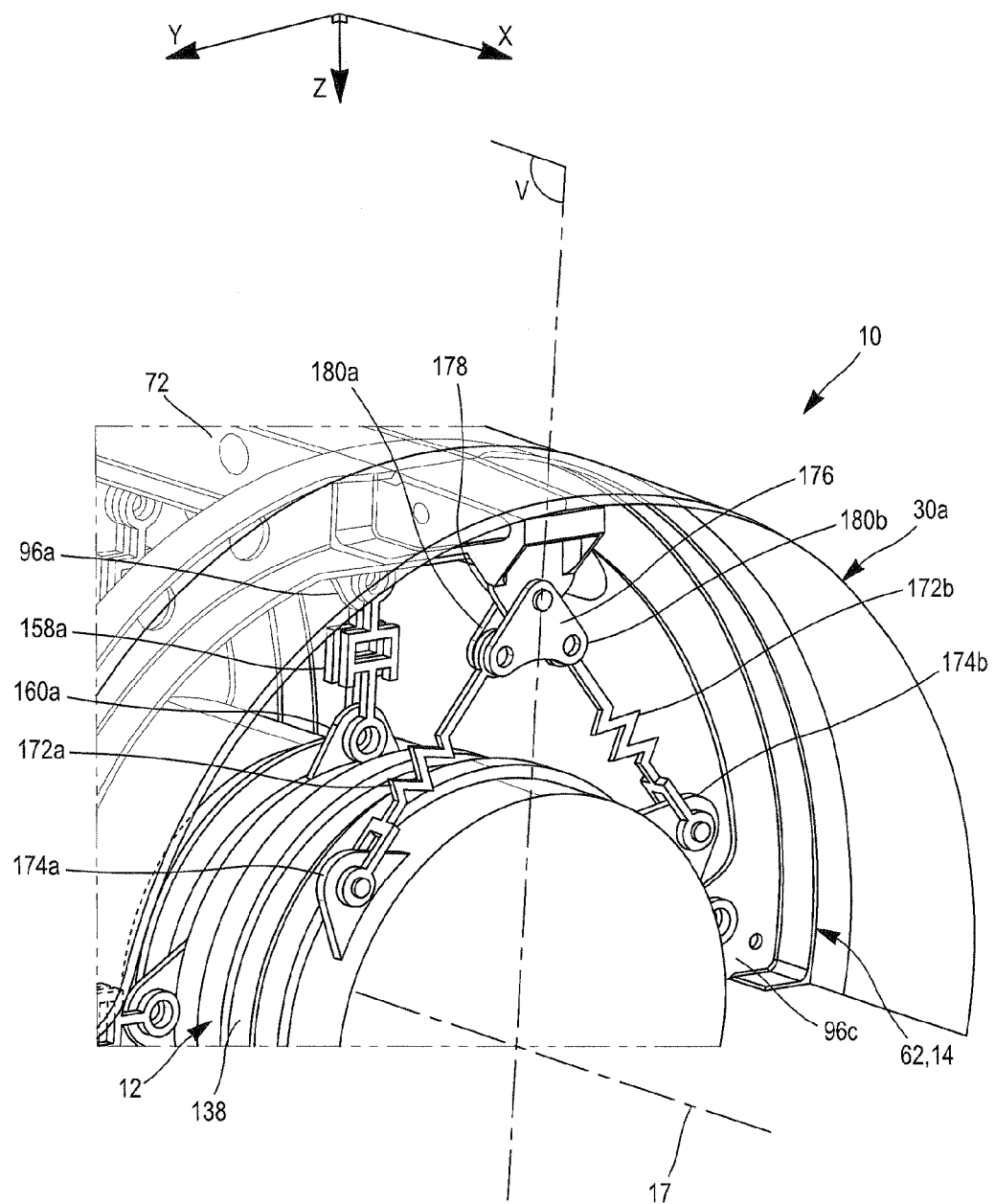
FIG. 14 is a partial diagrammatic perspective view of a propulsion unit according to another embodiment of the invention, seen from the front of the aircraft, more particularly illustrating a forward upper engine mounting of this propulsion unit.

FIG. 14 shows a propulsion unit 10 according to another embodiment of the invention, in which the mounting device 14 does not include any forward lateral engine mounting like the engine mounting 146 described above, but it comprises two forward upper engine mountings 72*a* and 172*b* connecting the two clevises 174*a*, 174*b* fixed to the forward casing 138 of the turbine engine 12 to a spreader 176 itself attached to a fitting 178 supported by the longitudinal beam 72. The two clevises 174*a*, 174*b* mentioned above are arranged on each side of the longitudinal plane V, such that the two forward upper engine mountings 172*a* and 172*b* are arranged approximately in an inverted "V" configuration. The spreader 176 has two clevises 180*a*, 180*b* also arranged on each side of the longitudinal plane V, in line with the two clevises 174*a*, 174*b* respectively fixed to the forward casing 138. Each of these forward upper engine mountings 172*a* and 172*b* is connected to the corresponding clevis 174*a*, 174*b* of the forward casing 138 through a ball joint connection, and to the corresponding clevis 180*a*, 180*b* of the spreader 176 through a pivot connection. Furthermore, the spreader itself is connected to the fitting 178 supported by the longitudinal beam 72 through a ball joint connection with some play along the longitudinal direction X.

The two forward upper engine mountings 172*a* and 172*b* can thus jointly resist forces along the vertical direction Z and forces along the transverse direction Y.

Figure 15:
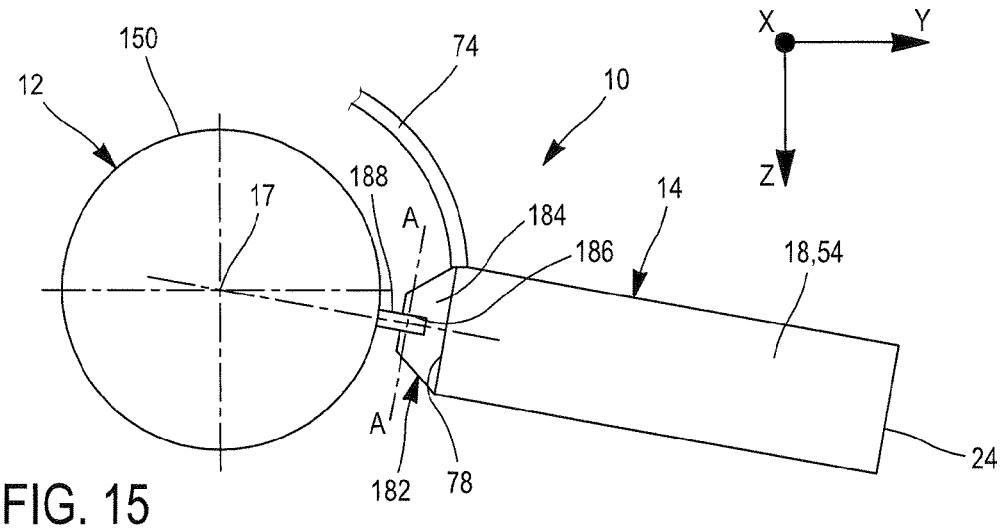
FIG. 15 is a partial diagrammatic cross-sectional view of a propulsion unit according to another embodiment of the invention.
Figure 16:
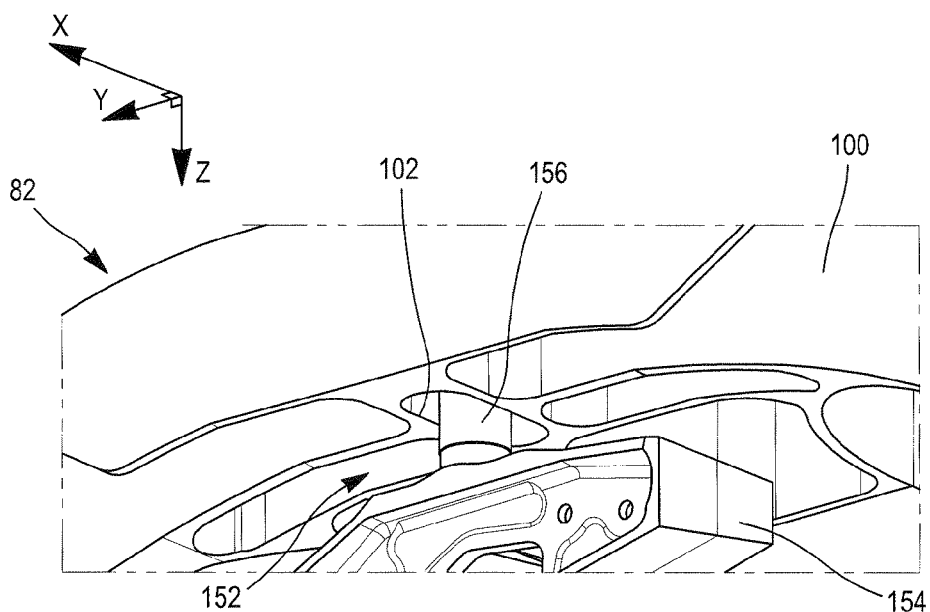
FIG. 16 is a partial diagrammatic perspective view of an aft upper engine mounting of the propulsion unit in FIG. 15.

FIGS. 15 and 16 show a propulsion unit 10 according to another embodiment of the invention, in which the mounting device 14 comprises a lateral engine mounting 182 designed to resist forces along the longitudinal direction X, and not to resist forces along the transverse direction Y as in the previous embodiments described above.

Figure 15A:
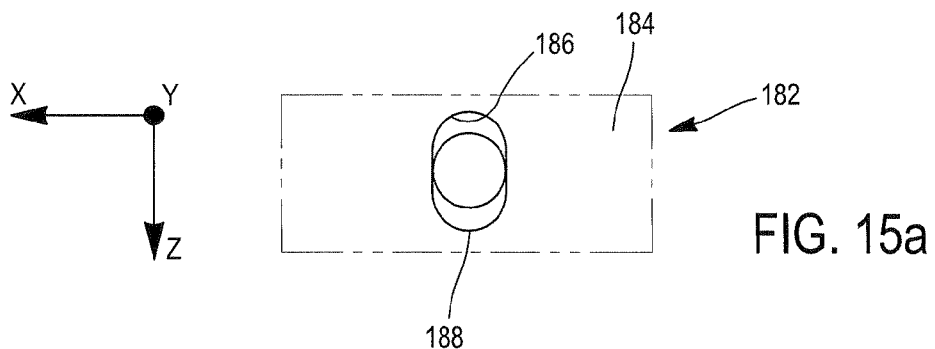
FIG. 15a is a longitudinal sectional view along plane A-A in FIG. 15 shown at larger scale, of a lateral engine mounting of the propulsion unit in FIG. 15.

This lateral engine mounting 182 comprises a ferrule 184 fixed on the rigid mounting structure 18, for example on the distal end 78 of the median spar 54. This ferrule 184 comprises a hole 186 into which a shear pin 188 or spigot is inserted fixed to the turbine engine casing 150. The hole 186 is elongated in shape along the vertical direction Z (FIG. 15*a*) such that the shear pin 188 is blocked in the hole 186 along the longitudinal direction X, but is free to move along the vertical direction Z.

In this embodiment, there is no need for the central aft engine mounting 152 to participate in resisting longitudinal forces, such that it may be dedicated solely to resisting forces along the transverse direction Y. In this case, as shown in FIG. 16, the hole 102 of this aft central engine mounting 152 may be extended along the longitudinal direction such that the corresponding shear pin 156 is blocked along the transverse direction Y but is free to move along the longitudinal direction X.

Furthermore, in this embodiment, the forward engine mounting is preferably of the same type as that shown in FIG. 14 described above, to assure that forces oriented along the vertical direction Z and also forces oriented along the transverse direction Y are resisted.

Furthermore as a variant, longitudinal forces may be resisted by two thrust rods of a known type, each with an aft end connected to the aft casing 144 of the turbine engine and a forward end connected to the distal end 26 of the mounting structure 18.

In this case, transverse forces may be resisted by a lateral engine mounting of the same type as the engine mounting 146 described above with reference to FIGS. 7 to 12. Furthermore, the forward upper engine mounting may then be dedicated to resist vertical forces as in the first embodiment described above, and therefore may be of the same type as the forward upper engine mounting 134 described above (FIG. 9).

Figure 17:
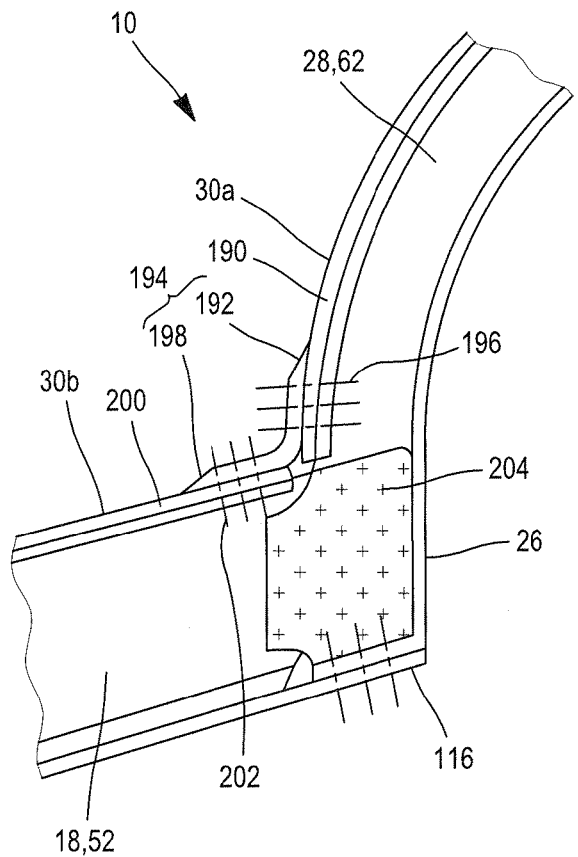
FIG. 17 is a partial diagrammatic cross-sectional view of a propulsion unit according to another embodiment of the invention showing the connection zone of the rigid substructure to the rigid mounting structure of the mounting device in this propulsion unit.

FIG. 17 shows a propulsion unit 10 according to another embodiment of the invention, in which the structural skin 30a and the aerodynamic upper skin 30b globally have the same shape as in the embodiments described above, but on the other hand they are not made in a single piece. These two skins 30a, 30b are spliced to each other in this case. The structural skin 30a has a proximal end portion 190 on which a first portion 192 of a fish plate 194 is fixed, for example by means of bolts or rivets of which only center lines 196 are shown in FIG. 17. The fish plate 194 comprises a second portion 198 fixed onto a distal end 200 of the aerodynamic upper skin 30b, also by means of bolts or rivets with center lines 202. The fish plate 194 preferably extends over the entire length of the rigid mounting structure 18.

In the example in FIG. 17, the spars 52, 54, 56 of the rigid mounting structure 18 are fixed to the forward arch 62, the median half arch 74 and the aft arch 64, either directly by means of bolts or rivets (not shown) with center lines 204, or by means of a fish plate.

Figure 18:
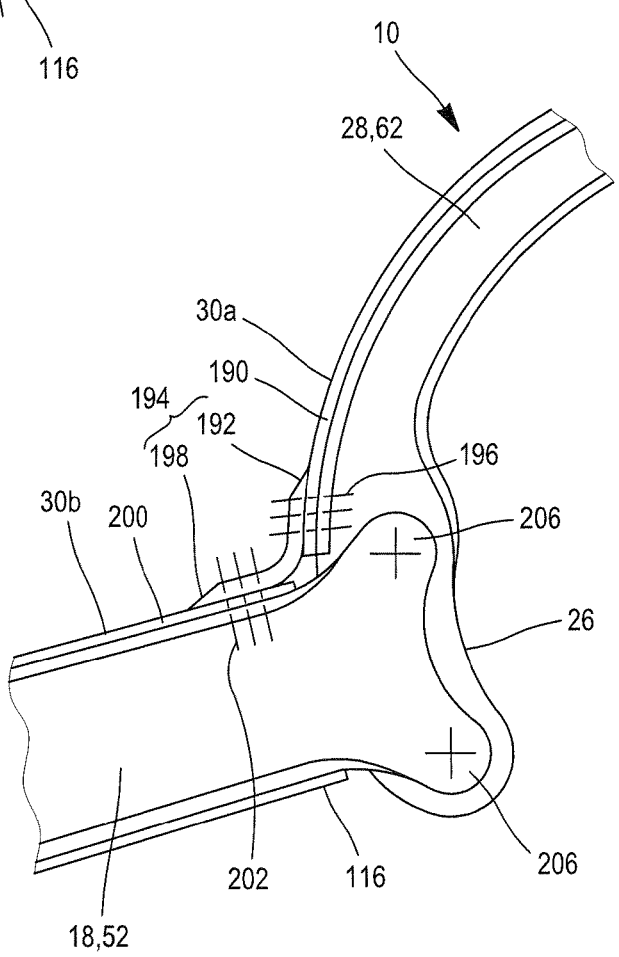
FIG. 18 is a view similar to FIG. 17, showing a variant embodiment of the propulsion unit.

As a variant, as shown in FIG. 18, spars 52, 54, 56 may be connected to the forward arch 62, to the median half-arch 74 and to the aft arch 64 respectively, by corresponding devises 206.

Figure 19:
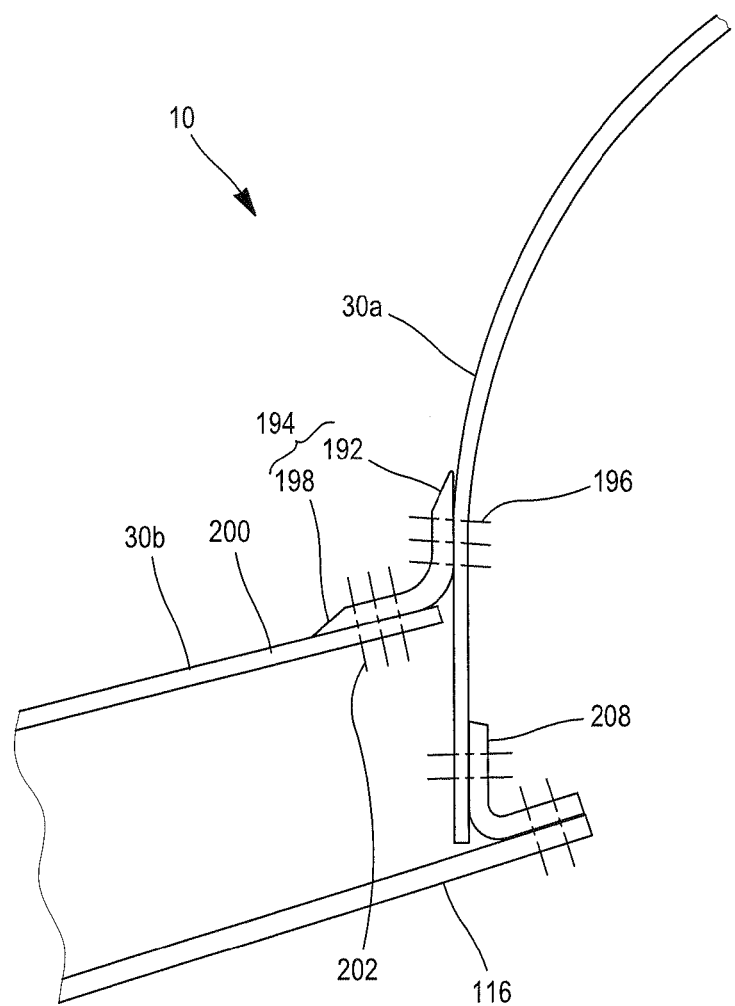
FIG. 19 is a view similar to FIG. 17 of the propulsion unit in this FIG. 17 seen along a sectional plane shifted longitudinally from the plane in FIG. 17.

In all cases, as can be seen in FIG. 19, the structural skin 30a may be prolonged downwards between each pair of successive spars of the rigid mounting structure 18, to enable attachment of this structural skin 30a by fish plating onto the lower skin 116 of the mounting device 14. For example, such splicing may be made by two fish plates 208 (only one of which can be seen in FIG. 19), the first of which is arranged between the forward spar 52 and the median spar 54, while the second is arranged between the median spar 54 and the aft spar 56. In the example shown, these fish plates 208 are fixed in contact with the radially inner face of the structural skin 30a, but as a variant these fish plates 208 may be fixed in contact with the radially outer face of the structural skin.

The invention may obviously be transposed to other types of turbine engines, particularly to a turbojet with a pair of open rotor pushers mounted at the forward end. In this case, the arrangement of the mounting device 14 may be inverted along the longitudinal direction, the additional arch 82 then being located at the forward end.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A propulsion unit for an aircraft, comprising:
a turbine engine with a longitudinal axis parallel to a longitudinal direction of said turbine engine, and
an engine mounting device designed to be added laterally on an aircraft structure,
said mounting device comprising a rigid mounting structure with a proximal end that will be connected to the aircraft structure and with a distal end arranged facing the turbine engine,
said rigid mounting structure supporting connecting means connecting said turbine engine to said rigid mounting structure, in which:
said connecting means comprise at least one arch with a proximal end connected to said rigid mounting structure and an opposite distal end;
said arch being concave towards said longitudinal axis;
said proximal end and distal end of said arch extend on each side of a longitudinal plane containing said longitudinal axis, said longitudinal plane extending vertically when said propulsion unit is fitted on an aircraft parked on the ground; and
when said arch is seen in a sectional view on a transverse plane orthogonal to said longitudinal axis, a first half-line and a second half-line delimit a first angular sector with an angle of between 45 degrees and 120 degrees, wherein the first half line starts from said longitudinal axis and passes through the distal end of said arch, and the second half-line starts from said longitudinal axis, is contained in said longitudinal plane, and intercepts said arch,
wherein said connecting means comprise a distal connecting element connecting the turbine engine to a distal mounting part of said arch and arranged on the same side as said distal end of said arch relative to said longitudinal plane, said distal mounting part being arranged such that when said arch is seen in a sectional view on said transverse plane, said distal mounting part extends outside a second angular sector defined such that:
the longitudinal axis is a vertex of the second angular sector,
the second angular sector forms an angle equal to between 25 degrees and 100 degrees,
the angular sector extends from said second half-line towards said distal end of said arch.

2. The propulsion unit according to claim 1, wherein said connecting means also comprise a proximal connecting element connecting the turbine engine to a proximal mounting part of said arch, said proximal mounting part being arranged such that when said arch is seen in a sectional view on said transverse plane, said proximal mounting part extends outside a third angular sector defined such that:
the longitudinal axis is a vertex of the third angular sector,
the third angular sector forms an angle equal to between 25 degrees and 100 degrees,
the third angular sector extends from said second half-line towards said rigid mounting structure.

3. The propulsion unit according to claim 1, wherein at least one of said distal connecting element and said proximal connecting element is a mechanical energy dissipation element arranged to damp turbine engine vibrations.

4. The propulsion unit according to claim 1, wherein:
said rigid mounting structure is in the form of a box,
said arch prolongs a spar which forms a first end of said rigid mounting structure along the longitudinal direction,
said connecting means comprise a second arch that prolongs a spar forming a second end of said rigid mounting structure, opposite said first end of said rigid mounting structure,
said second arch being concave towards said longitudinal axis of the turbine engine and having a distal end extending on the side of said longitudinal plane opposite said rigid mounting structure, and
when said second arch is seen in a sectional view on said transverse plane, a first half-line starting from said longitudinal axis and passing through the distal end of said second arch delimits a fourth angular sector with an angle between 45 degrees and 120 degrees, with a second half-line starting from said longitudinal axis, contained in said longitudinal plane, and intercepting said other arch.

5. The propulsion unit according to claim 1, wherein said connecting means comprise a longitudinal beam supported by each arch connected to said rigid mounting structure.

6. The propulsion unit according to claim 5, in which said longitudinal beam is centered relative to said longitudinal plane and supports a second additional arch offset along the longitudinal direction, from said rigid mounting structure, and centered relative to said longitudinal plane, said second arch supporting two lateral engine mountings arranged on each side of said longitudinal plane and designed to resist forces oriented along a vertical direction parallel to said longitudinal plane and orthogonal to said longitudinal direction, and a central engine mounting that is centered relative to said longitudinal plane and designed to at least resist forces oriented along a transverse direction orthogonal to said longitudinal and vertical directions.

7. The propulsion unit according to claim 6, wherein said central engine mounting supported by said second arch is also designed to resist forces oriented along the longitudinal direction.

8. The propulsion unit according to claim 6, wherein said rigid mounting structure supports an engine mounting at its distal end, designed to resist forces oriented along the longitudinal direction.

9. The propulsion unit according to claim 6, wherein said longitudinal beam supports an engine mounting arranged on the longitudinal side opposite said second arch relative to the rigid mounting structure, and designed at least to resist forces oriented along the vertical direction.

10. The propulsion unit according to claim 9, wherein said rigid mounting structure comprises an engine mounting at its distal end, designed to resist forces oriented along the transverse direction.

11. The propulsion unit according to claim 9, wherein said engine mounting, supported by said longitudinal beam and arranged on the longitudinal side opposite said second arch, is also designed to resist forces oriented along the transverse direction.

12. The propulsion unit according to claim 1, further comprising an external aerodynamic fairing, and in which:
said external aerodynamic fairing comprises a structural skin that covers and is fixed to each arch connected to said rigid mounting structure, extending at least as far as the distal end of the arch, and
said connecting means are designed such that part of the connection forces between the turbine engine and said rigid mounting structure is resisted by said structural skin of the external aerodynamic fairing.

13. An aircraft comprising at least one propulsion unit according to claim 1, wherein each arch connected to said rigid mounting structure comprises a part extending above the turbine engine of said propulsion unit when said aircraft is parked on the ground.

* * * * *